(12) United States Patent
Nakagawa

(10) Patent No.: US 8,014,642 B2
(45) Date of Patent: Sep. 6, 2011

(54) OPTICAL GATE ARRAY DEVICE

(75) Inventor: Goji Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 268 days.

(21) Appl. No.: 12/418,959

(22) Filed: Apr. 6, 2009

(65) Prior Publication Data

US 2009/0279830 A1  Nov. 12, 2009

Related U.S. Application Data

(60) Division of application No. 12/000,101, filed on Dec. 7, 2007, now Pat. No. 7,548,669, which is a continuation-in-part of application No. 11/640,232, filed on Dec. 18, 2006, now abandoned.

(30) Foreign Application Priority Data

Aug. 23, 2006 (JP) ................................. 2006-226552
Aug. 21, 2007 (JP) ................................. 2007-214388

(51) Int. Cl.
*G02B 6/32* (2006.01)
(52) U.S. Cl. .......................................................... 385/33
(58) Field of Classification Search .................... None
See application file for complete search history.

(56) References Cited

U.S. PATENT DOCUMENTS

| 4,281,905 A * | 8/1981 | Harvey et al. ................. 359/282 |
|---|---|---|
| 4,852,962 A | 8/1989 | Nicia |
| 4,859,012 A | 8/1989 | Cohn |
| 4,957,342 A | 9/1990 | Boudreau et al. |
| 5,305,412 A | 4/1994 | Paoli |
| 5,633,961 A | 5/1997 | Kirkby et al. |
| 5,745,271 A * | 4/1998 | Ford et al. ........................ 398/87 |
| 5,793,520 A * | 8/1998 | Stace et al. ..................... 359/320 |
| 5,936,752 A * | 8/1999 | Bishop et al. ................... 398/90 |
| 6,238,102 B1 | 5/2001 | Ohtani et al. |
| 6,747,793 B1 | 6/2004 | Flanders |
| 7,231,107 B1 | 6/2007 | Zhong et al. |
| 7,277,607 B2 | 10/2007 | Takushima et al. |
| 7,317,873 B2 | 1/2008 | Aoki |
| 2003/0002781 A1 | 1/2003 | Ford et al. |
| 2005/0002600 A1 | 1/2005 | Ducellier et al. |
| 2006/0233490 A1 | 10/2006 | Lin |

FOREIGN PATENT DOCUMENTS

CA  2273538 A1  12/1999
(Continued)

OTHER PUBLICATIONS

UK Search Report dated Apr. 18, 2007 in corresponding UK Application No. GB0625222.5.

(Continued)

*Primary Examiner* — Mike Stahl
(74) *Attorney, Agent, or Firm* — Fujitsu Patent Center

(57) ABSTRACT

An optical gate array device which permits the use of an optical gate array with a pitch smaller than the diameter of optical fibers. The optical gate array has an array of optical gates, and an optical fiber array has an array of optical fibers. A lens is arranged between the optical gate array and the optical fiber array, for collectively achieving optical coupling between all of the optical gates of the optical gate array and all of the optical fibers of the optical fiber array.

3 Claims, 22 Drawing Sheets

FOREIGN PATENT DOCUMENTS

| JP | 4-098209 A | 3/1992 |
|---|---|---|
| JP | 4-116507 A | 4/1992 |
| JP | 4-119407 U | 10/1992 |
| JP | 6-222408 A | 8/1994 |
| JP | 8-211428 A | 8/1996 |
| JP | 2000-121889 A | 4/2000 |

OTHER PUBLICATIONS

Patent Abstract of Japan, Japanese Publication No. 2003-149614, published May 21, 2003.

Patent Abstract of Japan, Japanese Publication No. 2002-353896, published Dec. 6, 2002.

Patent Abstract of Japan, Japanese Publication No. 2000-236138, published Aug. 29, 2000.

"Japanese Office Action", mailed by JPO and corresponding to Japanese application No. 2007-214388 on Aug. 3, 2010, with partial English translation.

USPTO, (Stahl) Notice of Allowance and Notice of Allowability, Feb. 10, 2009, in parent (section 120 priority) U.S. Appl. No. 12/000,101 [now issued as US 7,548,669].

USPTO, (Stahl) Non-Final Rejection, Jul. 1, 2008, in parent (section 120 priority) U.S. Appl. No. 12/000,101 [now issued as US 7,548,669].

Partial Translation of Japanese Publication No. 2000-236138, Published Aug. 29, 2000, Filed in U.S. Appl. No. 12,000,101.

Patent Abstract of Japan, Publication No. 2007-033853, published Feb. 8, 2007, Filed in U.S. Appl. No. 12,000,101.

* cited by examiner

Lens 27a can be placed closer to SOA unit 21.

⇩

Packaging density can be increased.

OPTICAL GATE ARRAY DEVICE

CROSS-REFERENCE TO RELATED APPLICATIONS

This application is a Divisional application of parent application Ser. No. 12/000,101, filed Dec. 7, 2007, now U.S. Pat. No. 7,548,669 which is a continuation-in-part of application Ser. No. 11/640,232, filed Dec. 18, 2006, now abandoned; parent application Ser. No. 12/000,101 further claims the benefit of priority from Japanese Patent Application No. 2006-226552, filed on Aug. 23, 2006, and Japanese Patent Application No. 2007-214388, filed on Aug. 21, 2007. All four of the aforementioned applications are herein incorporated by reference in their entireties.

BACKGROUND OF THE INVENTION

1. Field of the Invention

The present invention relates to optical gate array devices, and more particularly, to an optical gate array device having an array of optical gates for controlling the transmission of optical signals.

2. Description of the Related Art

With the recent increasing demand for broadband communication services, optical communication networks have become capable of carrying a large volume of data over long distances, and the development of high-speed large-capacity WDM (Wavelength Division Multiplex: wavelength division multiplexing technique for multiplexing different wavelengths of light to simultaneously transmit multiple signals over a single optical fiber) has been actively pursued.

Also, because of the rapid diffusion of the Internet and an increase in large-capacity content, optical communication networks capable of higher-speed, larger-capacity data transmission and having flexibility are demanded. In the circumstances, optical packet switching is attracting attention as a technology for configuring such optical communication networks.

With the optical packet switching technology, communication information is switched directly in the form of optical packets. Compared with conventional switching techniques in which optical signals are once converted to electrical signals, no restriction is imposed by the electronic processing speed, and since optical signals can be processed at a rate equivalent to the light propagation delay time, high-speed, large-capacity transmission can be achieved.

In the case of switching an optical signal on a packet-by-packet basis, a gate switch is used to switch the optical signal ON and OFF. There are two major types of gate switch for switching optical signals ON and OFF through electric control, namely, the type adapted to vary the absorption of light by utilizing an electro-absorption effect, and the type adapted to vary the gain of a semiconductor amplifier by means of a driving current supplied thereto.

An electro-absorption type gate switch has a drawback in that the loss is high even in the state of transmission. On the other hand, a semiconductor optical amplifier (SOA), which is a switch adapted to vary its gain by means of the driving current supplied thereto, not only functions as an optical gate for switching light ON and OFF but also has an amplifying function (when the gate is ON, light amplified thereby is output). Thus, SOA is currently watched as an optical device capable of high-speed switching with low loss of optical signal.

Further, SOA has a large extinction ratio between gate ON (open) and OFF (closed) states and is also capable of reducing optical loss by means of its amplifying mechanism. Moreover, since SOA is an optical device made of semiconductor, small-sized SOA can be fabricated at low cost by using semiconductor integration technology.

FIG. 18 shows a conventional arrangement for optical coupling between an SOA and an optical fiber. If light pumped inside the chip of an SOA 51 is reflected at its end face, unwanted oscillation is caused by the reflected light, deteriorating the characteristics of the SOA. It is therefore necessary that the end face of the SOA should have a low reflectance of −50 dB or less.

Accordingly, the end face of the SOA 51 is coated with an AR (Anti Reflection) coating (not shown), which is a non-reflective film. However, the AR coating alone is unable to satisfactorily reduce the return loss, and therefore, the SOA 51 is obliquely positioned such that the normal H perpendicular to the end face of the SOA 51 and an optical waveguide L within the SOA 51 form an angle of, for example, 7°.

Since the SOA 51 is positioned in this manner, light from an optical fiber 52a obliquely passes through the SOA 51 along the optical waveguide L toward an optical fiber 52b, and the light reflected at the end face of the chip propagates in a direction A shown in the figure (at an angle of 14° with respect to the optical waveguide L). Thus, the reflected light is prevented from returning back through the optical waveguide L, and therefore, does not interfere with the incoming light.

Let it be assumed that the refractive index of the light incidence-side medium is $n_1$, that the incidence angle is $\theta_1$, that the refractive index of the light emergence-side medium is $n_2$, and that the emergence angle is $\theta_2$. From Snell's law, $n_1 \cdot \sin\theta_1 = n_2 \cdot \sin\theta_2$, and in the case where the refractive index $n_1$ of the material of the SOA 51 is 3.2, then $3.2 \cdot \sin 7° = 1 \cdot \sin\theta_2$, because the incidence angle $\theta_1$ with respect to the end face is 7° and the refractive index $n_2$ of air is 1. Consequently, the emergence angle $\theta_2$ is nearly equal to 22.7°, that is, light is output from the end face of the SOA 51 at the emergence angle 22.7°.

Thus, the light output from the end face of the SOA 51 at the emergence angle 22.7° is input to the optical fiber 52b. Since the SOA 51 is obliquely positioned, lenses 53a and 53b are used to achieve optical coupling between the SOA 51 and the respective optical fibers 52a and 52b. Specifically, the lens 53a optically couples the input-side optical fiber 52a with the SOA 51, and the lens 53b optically couples the output-side optical fiber 52b with the SOA 51.

FIG. 19 also shows a conventional arrangement for optical coupling between the SOA 51 and an optical fiber, wherein spherical lensed fibers 54a and 54b are used in conjunction with the SOA 51, by way of example. The distal end of each of the spherical lensed fibers 54a and 54b is formed into a spherical shape and serves as a lens, and therefore, the lenses 53a and 53b shown in FIG. 18 can be omitted.

As conventional techniques using SOA, a technique has been proposed in which a semiconductor optical amplifier is used in combination with an external resonator constituted by a fiber grating, and the fiber grating has a distal end formed into a spherical shape to be optically coupled with the light emergence end face of the semiconductor optical amplifier coated with a low-reflection film (e.g., Unexamined Japanese Patent Publication No. 2000-236138 (paragraph nos. [0045] to [0054], FIG. 1)).

FIGS. 20 and 21 each illustrate the optical coupling between an SOA array and an optical fiber array. The figures individually show only one side of the arrangement, with an input-side optical fiber array and an input-side lens array omitted. In FIG. 20, an optical fiber array 64, which is an array of optical fibers 64a to 64d, is optically coupled with an SOA array 61, which is an array of SOAs 61*a* to 61*d*, through a lens array 62, which is an array of lenses 62*a* to 62*d*. In FIG. 21, a spherical lensed fiber array 65, which is an array of spherical lensed fibers 65*a* to 65*d*, is optically coupled with the SOA array 61.

In either of the arrangements shown in FIGS. 20 and 21, when optically coupling the SOA array and the optical fiber array, it is necessary that the pitch P1 (distance between the optical waveguides of adjacent SOAs) of the SOA array should be equal to the pitch P2 (distance between the centers of the cores of adjacent optical fibers) of the optical fiber array.

When manufacturing SOA arrays, on the other hand, the pitch P1 of the SOA array should preferably be reduced as small as possible, in order to increase the number of SOAs mounted per unit area and thereby heighten the degree of integration. However, in conventional SOA arrays, SOAs should not be arrayed with a pitch smaller than the diameter of the optical fiber, giving rise to the problem that the degree of integration of SOA arrays cannot be improved.

FIG. 22 illustrates the problem associated with the conventional optical coupling arrangements. In order to mount more SOAs per unit area of a wafer (thin substrate of semiconductor used for the manufacture of IC chips), SOAs need to be arrayed with a narrower pitch.

In the conventional optical coupling arrangements, however, the pitch P1 of the SOA array must be equal to the pitch P2 of the optical fiber array (P1=P2), in order for the optical coupling to be achieved between the SOA array and the optical fiber array. Thus, as seen from the figure, the narrowest allowable pitch of the SOA array is equal to the pitch with which optical fibers are arrayed in contact with each other, namely, the pitch equal to the diameter of the optical fiber.

Specifically, ordinary optical fibers have a diameter of 125 µm, and therefore, the pitch of the SOA array should be 125 µm at the smallest. Accordingly, even though more SOAs can be mounted on the wafer, the conventional optical coupling arrangements do not permit SOAs to be arrayed with a pitch smaller than 125 µm corresponding to the diameter of optical fibers, posing a problem that the degree of integration of SOA arrays cannot be improved (if the pitch of the SOA array is set smaller than the diameter 125 µm of optical fibers, then the optical coupling between the SOAs and the optical fibers cannot be achieved).

Further, the SOA has a beam spot size (the radius of a light beam passing through the optical waveguide of the SOA) smaller than that of the optical fiber. A problem therefore arises in that the conventional optical coupling arrangements are poor in optical coupling efficiency.

SUMMARY OF THE INVENTION

The present invention was created in view of the above circumstances, and an object thereof is to provide an optical gate array device which permits SOAs to be arrayed with a pitch smaller than the diameter of optical fibers and which is also improved in optical coupling efficiency.

To achieve the object, there is provided an optical gate array device for controlling optical signals. The optical gate array device comprises an optical gate array having an array of optical gates, an optical fiber array having an array of optical fibers, and a lens arranged between the optical gate array and the optical fiber array, for collectively achieving optical coupling between all of the optical gates of the optical gate array and all of the optical fibers of the optical fiber array.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
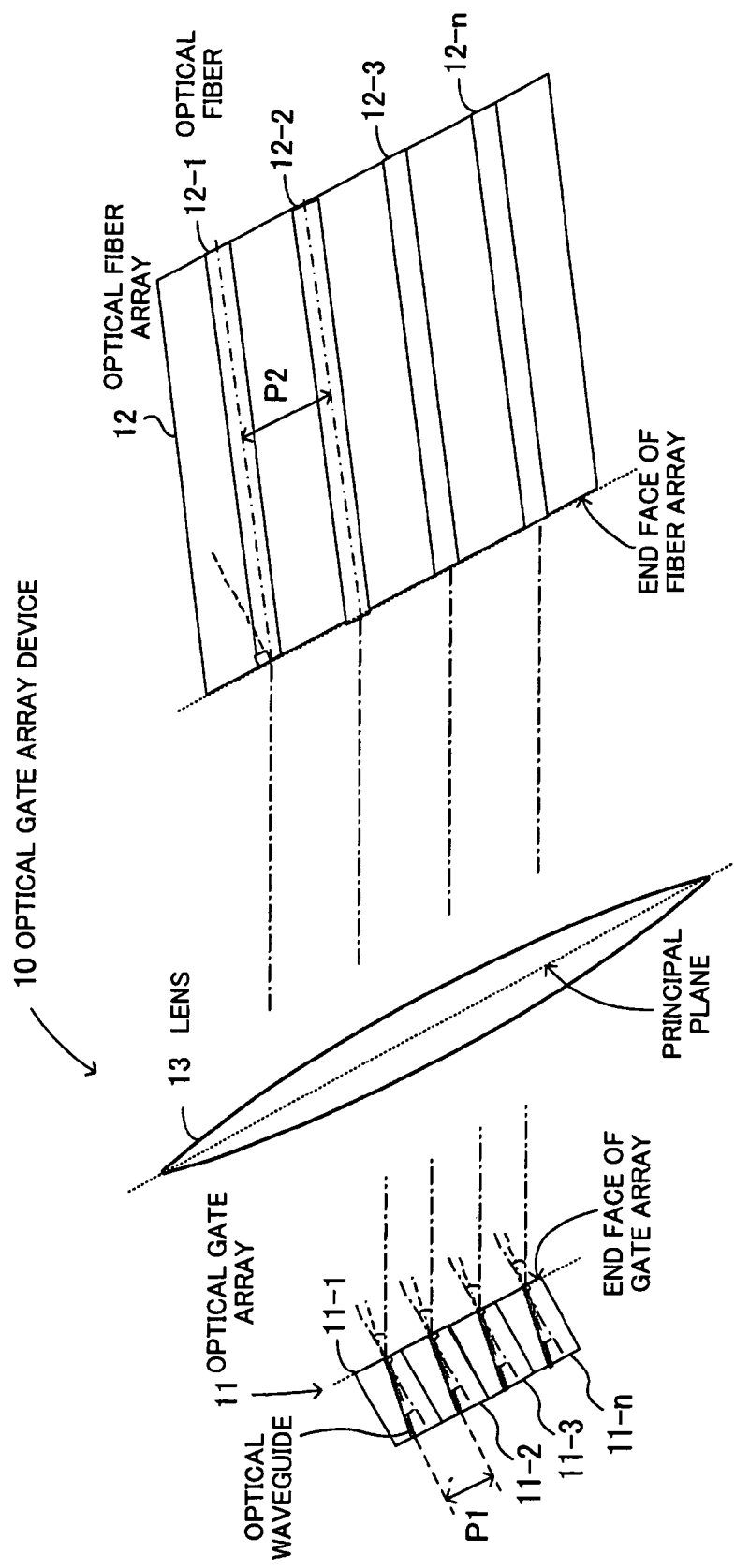
FIG. 1 illustrates the principle of an optical gate array device.

Preferred embodiments of the present invention will be described below with reference to the accompanying drawings, wherein like reference numerals refer to like elements throughout. FIG. 1 illustrates the principle of an optical gate array device. The optical gate array device 10 includes an optical gate array 11, an optical fiber array 12 and a lens 13, and controls the transmission of optical signals.

The optical gate array 11 is an array of optical gates 11-1 to 11-*n*, and the optical fiber array 12 is an array of optical fibers 12-1 to 12-*n*. The lens 13 is a single bulk lens arranged between the optical gate array 11 and the optical fiber array 12.

When optical signals are propagated from the optical gate array 11 to the optical fiber array 12, the lens 13 receives the optical signals emerging from all of the optical gates 11-1 to 11-*n* of the optical gate array 11, to collectively achieve optical coupling between the optical gates 11-1 to 11-*n* and the optical fibers 12-1 to 12-n. On the other hand, when optical signals are propagated from the optical fiber array 12 to the optical gate array 11, the lens 13 receives the optical signals emerging from all of the optical fibers 12-1 to 12-n of the optical fiber array 12, to collectively achieve optical coupling between the optical fibers 12-1 to 12-n and the optical gates 11-1 to 11-n.

The lens-side end face of the optical gate array 11, the principal plane (principal flat plane) of the lens 13 and the lens-side end face of the optical fiber array 12 are arranged parallel with each other. Also, the optical fiber array 12 is positioned with the angle of its end face adjusted so that when light emerging from the lens 13 is input to the optical fibers 12-1 to 12-n, the light refracted at the end faces of the optical fibers 12-1 to 12-n may be directed along the centers of the cores of the respective optical fibers 12-1 to 12-n.

In the arrangement shown in FIG. 1, the pitch P1 of the optical gate array 11 and the pitch P2 of the optical fiber array 12 can be so set as to fulfill the relationship P1<P2, thus permitting the optical gates to be arrayed with a pitch smaller than the diameter of the optical fibers.

Figure 2:
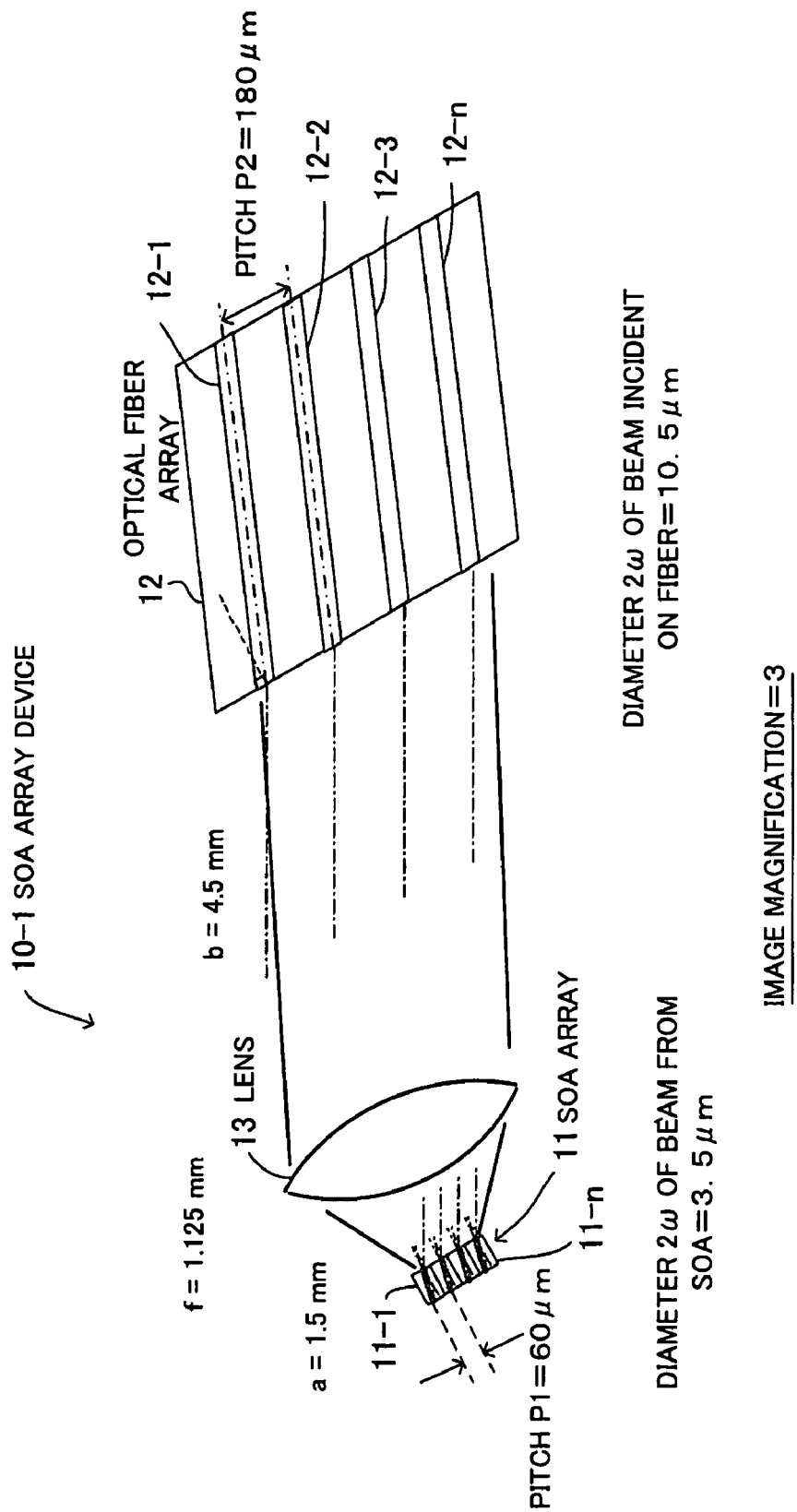
FIG. 2 shows an optical system according to a first embodiment.

Referring now to specific embodiments, the optical system of the optical gate array device 10 will be explained. In the following, the optical gate will be referred to as SOA. FIG. 2 shows an optical system according to a first embodiment, wherein an SOA array device 10-1 of the first embodiment includes an SOA array 11, the optical fiber array 12, and the lens 13.

The lens 13 receives optical signals from SOAs 11-1 to 11-n of the SOA array 11 and outputs the optical signals therefrom to the optical fiber array 12. At this time, because of the image magnification of the lens 13, the interval between the light beams emerging from the SOAs 11-1 to 11-n is enlarged, and also the small beam spot size of the SOAs 11-1 to 11-n is enlarged to a greater beam spot size of the optical fibers 12-1 to 12-n. Namely, both the beam interval and the beam spot size are enlarged by the lens 13.

The following explains the design of the first embodiment. The optical fibers 12-1 to 12-n, which are SMFs (Single Mode Fibers), have a beam diameter of 10.5 μm, and it is assumed that the SOAs 11-1 to 11-n have a beam diameter of 3.5 μm. The beam diameter represents a mode field diameter (MFD), and MFD will be briefly explained with reference to FIG. 3.

Figure 3:
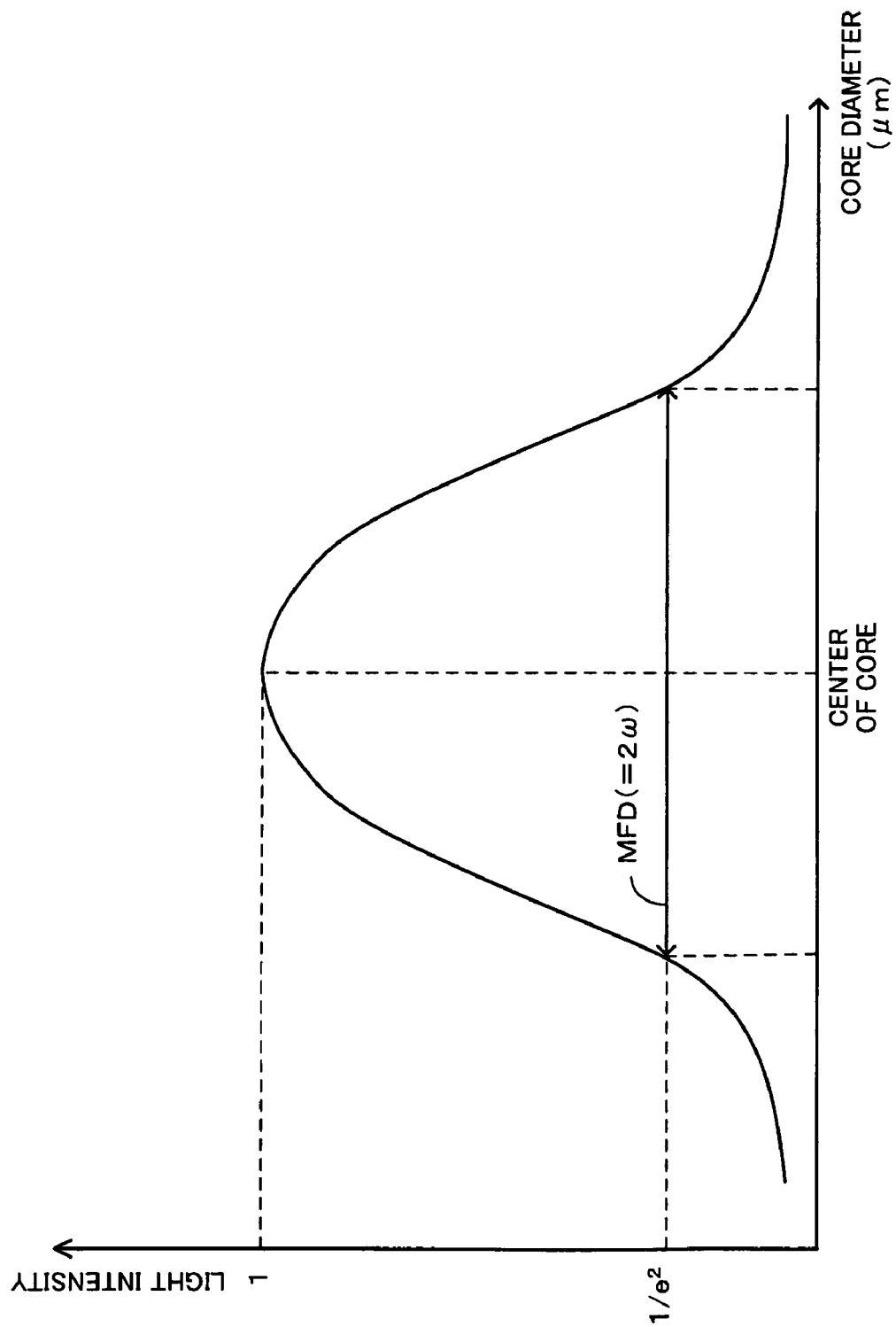
FIG. 3 illustrates MFD.

FIG. 3 illustrates MFD, wherein the vertical axis indicates light intensity and the horizontal axis indicates core diameter. A light beam emerging from an SOA or an optical fiber is not a parallel beam but a radiant beam that radially spreads. MFD is an index representing the degree of such beam spreading relative to the core diameter. The light intensity distribution can be plotted as a curve similar to a Gaussian distribution, as shown in the figure, wherein the light intensity is highest at the center of the core and gradually decreases toward outer regions of the core.

Provided the maximum light intensity at the center of the core is "1", the MFD is generally defined as a core diameter across the curve where the light intensity is at $1/e^2$ (about 13.5% of the maximum value "1"; e is the base (=2.718 . . . ) of the natural logarithm).

Generally, the radius of the core diameter which equals $1/e^2$ is called the beam spot size and expressed as ω, and the core diameter equal to $1/e^2$ is called the MFD (beam diameter) and expressed as 2ω. For wavelengths around 1550 nm, an SMF optical fiber has an MFD of about 10.5 μm.

Reverting to the explanation of the design, the image magnification is set to 3, since the ratio of the beam diameters is 10.5/3.5=3. Assuming that the distance from the end face of the SOA array 11 to the principal plane of the lens 13 is "a" and that the distance from the principal plane of the lens 13 to the end face of the optical fiber array 12 is "b", the image magnification is equal to b/a. Accordingly, the distances are set as follows: a=1.5 mm and b=4.5 mm (4.5/1.5=3), for example, so that the image magnification may equal 3.

On the other hand, where the pitch P1 of the SOA array 11 is 60 μm, the intervals of light beams emerging from the SOAs 11-1 to 11-n are expanded three times, namely, to 180 μm (=60 μm×3) by the lens 13 because the image magnification is equal to 3. The pitch P2 of the optical fiber array 12 is therefore set to 180 μm.

One of typical parameters that need to be taken into account when selecting the lens 13 is focal distance. Where parallel beams of light are incident on the lens, the focal distance is the distance from the lens to the focal point where the beams emerging from the lens are converged.

Provided the focal distance of the lens 13 is f, the relationship between the distance "a" from the end face of the SOA array 11 to the principal plane of the lens 13 and the distance "b" from the principal plane of the lens 13 to the end face of the optical fiber array 12 can be expressed by the following equation (1):

$$(1/a)+(1/b)=1/f \qquad (1)$$

In this instance, a=1.5 mm and b=4.5 mm, and therefore, f=1.125 mm. Accordingly, where a=1.5 mm and b=4.5 mm, a lens with a focal distance "f" of 1.125 mm is selected as the lens 13. Conversely, where a lens with a focal distance "f" of 1.125 mm is to be used as the lens 13 and the distance "a" is set to 1.5 mm, for example, the distance "b" (=4.5 mm) can be derived from the equation (1).

In the above explanation of the design, the numerical values are given by way of example only and may alternatively be as follows: Where image magnification=3, a=3 mm and b=9 mm, f is found to be 2.25 from the equation (1), showing that a lens with the focal distance 2.25 mm should be selected as the lens 13.

Figure 20:
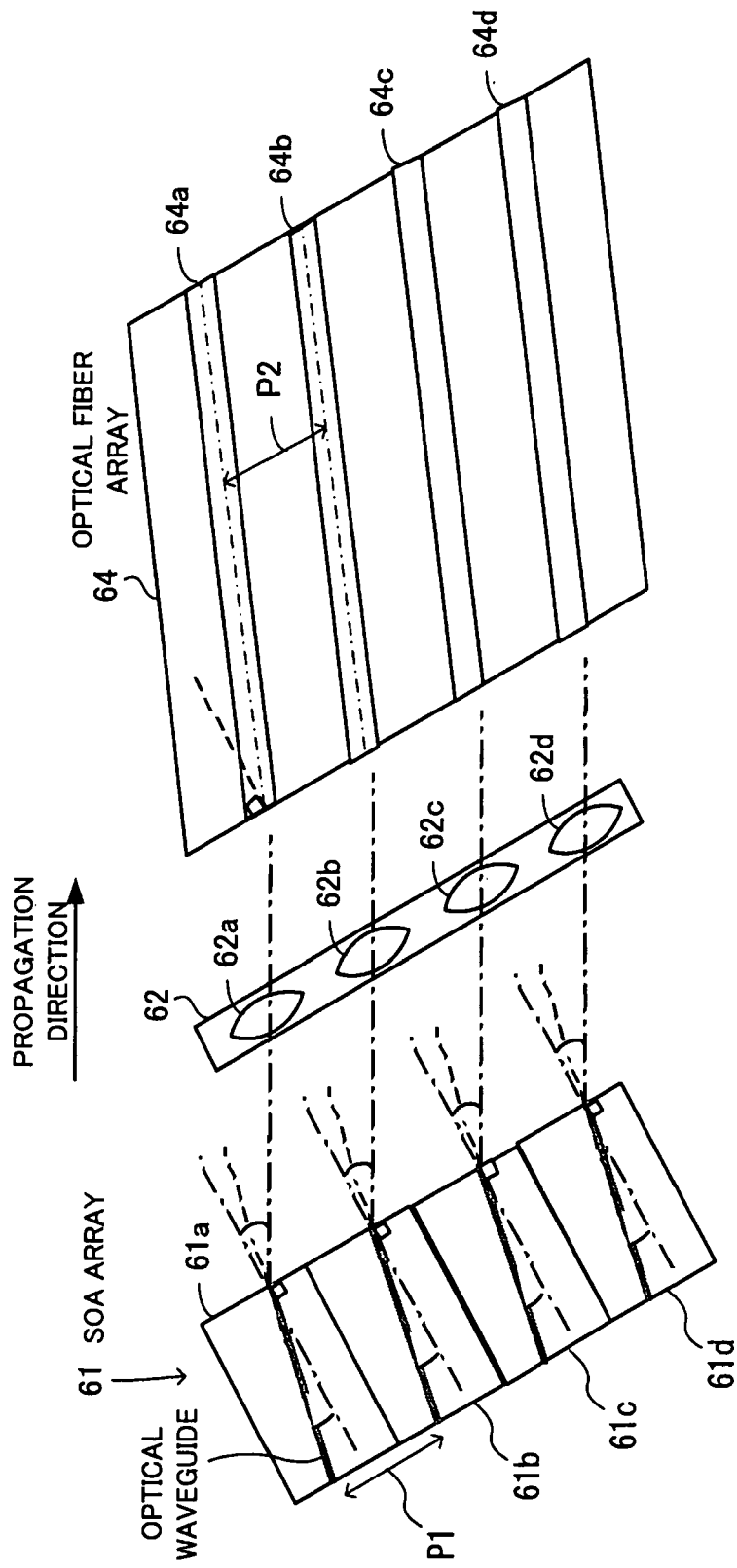
FIG. 20 illustrates optical coupling between an SOA array and an optical fiber array.
Figure 21:
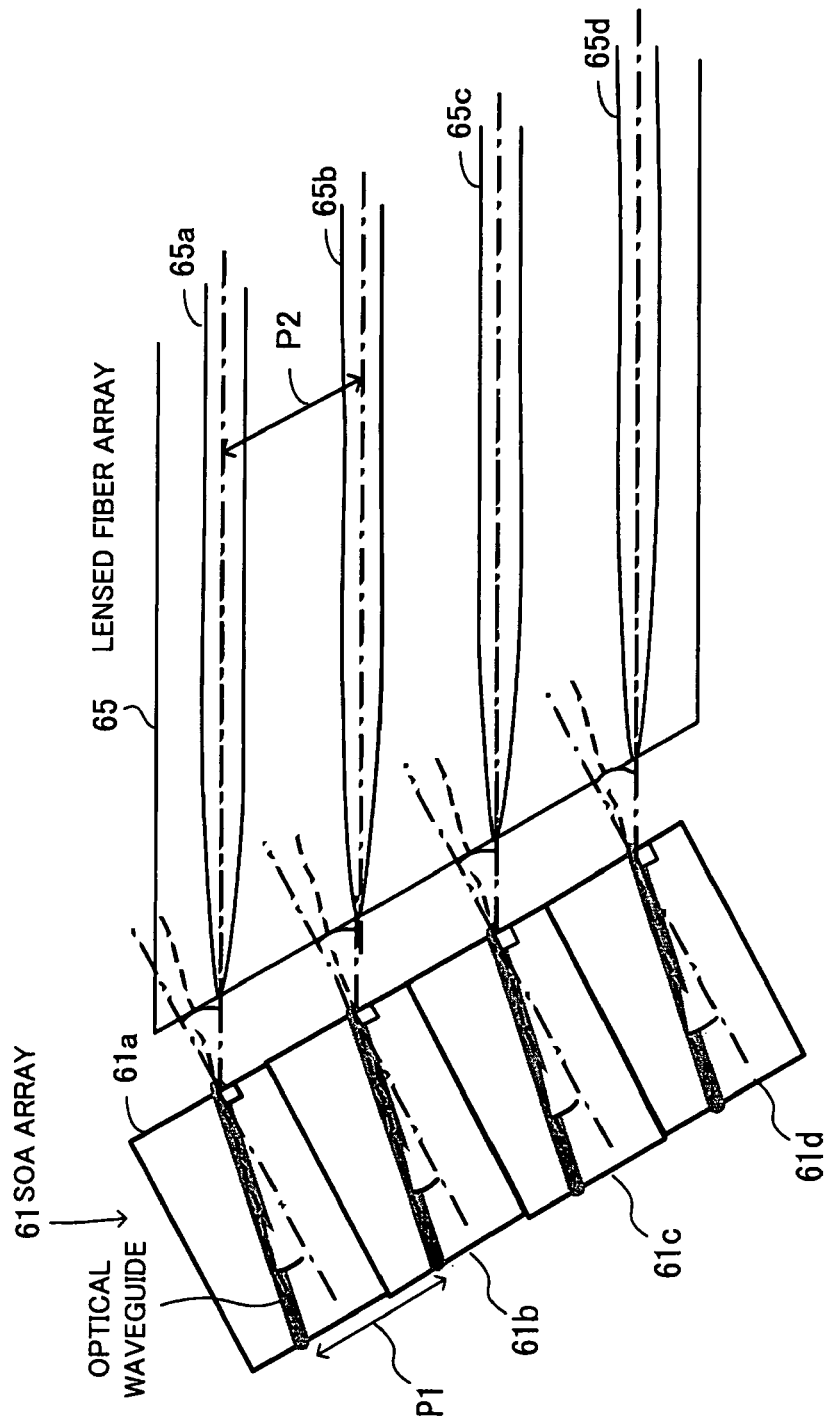
FIG. 21 also illustrates optical coupling between the SOA array and an optical fiber array.
Figure 22:
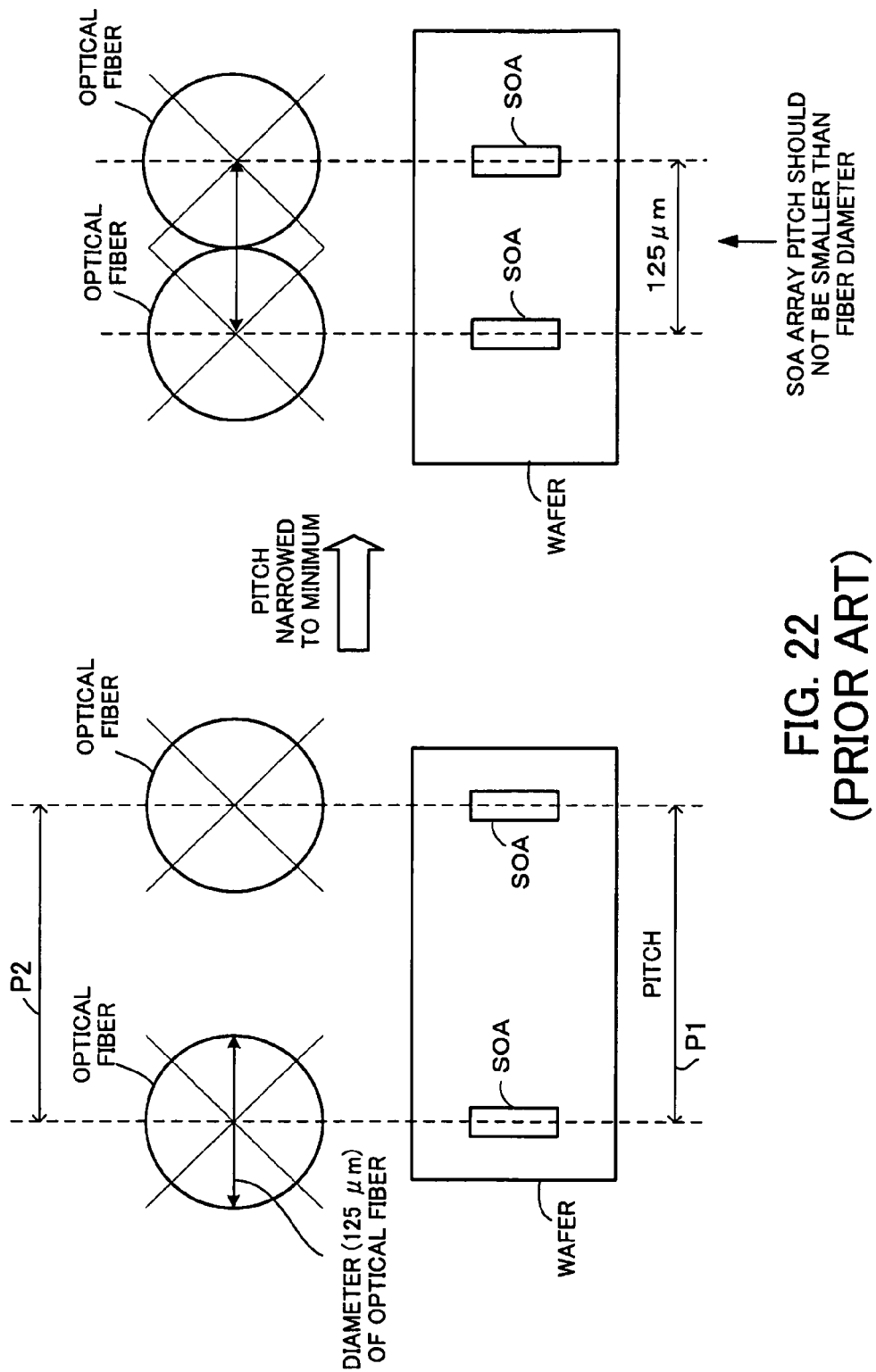
FIG. 22 illustrates a problem associated with the conventional optical coupling arrangements.

In the conventional arrangements shown in FIGS. 20 and 21, the SOA array and the optical fiber array are optically coupled to each other by using the lens array 62 which includes the lenses 62a to 62d arrayed so as to correspond to the respective SOA chips 61a to 61d of the SOA array 61, or the lensed fiber array 65 which includes the spherical lensed fibers 65a to 65d arrayed so as to correspond to the respective SOA chips 61a to 61d. Consequently, the pitch of the SOA array and the pitch of the optical fiber array must be equal to each other and there is a limit to the narrowest allowable pitch of the SOA array.

In the aforementioned SOA array device 10-1, by contrast, the image magnification of the lens is determined so as to be equal to the ratio of the beam spot size of the optical fibers to that of the SOAs (i.e., the ratio of the beam diameter of the optical fibers to that of the SOAs), and the ratio of the pitch of the optical fiber array to that of the SOA array is set to be equal to the image magnification.

Consequently, the beam spot size 3.5 μm of the SOAs 11-1 to 11-n is enlarged three times so as to be equal to the beam spot size 10.5 μm of the optical fibers 12-1 to 12-n, thus making it possible to improve the optical coupling efficiency.

Also, the pitch (P1) 60 μm of the SOA array 11 is expanded three times to 180 μm on the emergence side of the lens 13, and thus the pitch (P2) of the optical fiber array 12 is set to 180 μm. Namely, unlike the conventional arrangements, it is unnecessary to make the pitch of the SOA array equal to that of the optical fiber array in order to achieve optical coupling between the two arrays. Thus, since the pitch of the SOA array may be smaller than the diameter (125 μm) of the optical fibers, an SOA array with a pitch smaller than the diameter (125 μm) of the optical fibers can be used, making it possible to increase the degree of integration of the optical gate array.

For the lens 13 selected in the above manner, an eccentric lens may be used of which the centers of the convex surfaces are shifted from each other such that, when the lens 13 is obliquely positioned, the centers of the incidence- and emergence-side convex surfaces are at the same level (incident light refracted at the surface of the lens 13 is directed along the center of the lens 13).

Figure 4:
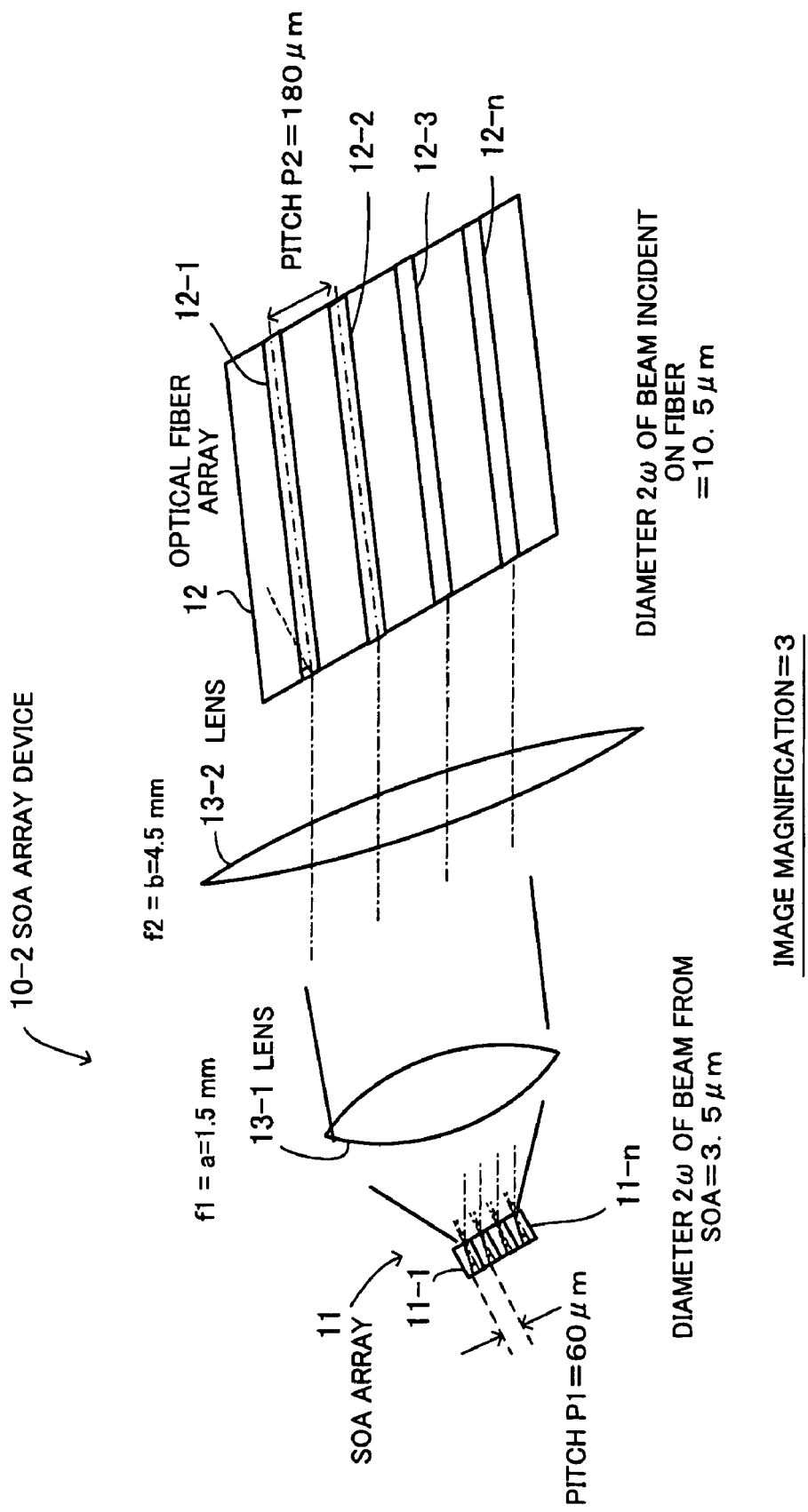
FIG. 4 shows an optical system according to a second embodiment.

The following explains the design of a second embodiment. FIG. 4 shows an optical system according to the second embodiment. As illustrated, an SOA array device 10-2 of the second embodiment includes a plurality of lenses, namely, a lens 13-1 (first lens) and a lens 13-2 (second lens), arranged between the SOA array 11 and the optical fiber array 12. In this case, the principal planes of the lenses 13-1 and 13-2 and the end faces of the SOA array 11 and optical fiber array 12 are arranged parallel with one another.

It is assumed that the conditions for the design are: the beam diameter of the optical fibers 12-1 to 12-$n$ being 10.5 μm, the beam diameter of the SOAs 11-1 to 11-$n$ being 3.5 μm, image magnification=3, and the pitch of the SOA array 11 being 60 μm, like the first embodiment.

In the second embodiment, the SOA array 11 and the lens 13-1 constitute a confocal system, and the lens 13-2 and the optical fiber array 12 also constitute a confocal system. The term "confocal" signifies a state in which a light source or a light receiver is arranged at the focus of a lens or a state in which two or more lenses are arranged such that their foci coincide with each other. Accordingly, the SOA array 11 is positioned at the focal point of the lens 13-1, and the optical fiber array 12 is positioned at the focal point of the lens 13-2.

The overall image magnification of the lenses 13-1 and 13-2 constituting a confocal system is equal to f2/f1, where f1 is the focal distance of the lens 13-1 and f2 is the focal distance of the lens 13-2. Namely, the distance "a" from the end face of the SOA array 11 to the principal plane of the lens 13-1 is equal to the focal distance "f1" of the lens 13-1, and the distance "b" from the principal plane of the lens 13-2 to the end face of the optical fiber array 12 is equal to the focal distance "f2" of the lens 13-2. The distance between the lenses 13-1 and 13-2 is set to f1+f2. Light emerging from the SOA array 11 arranged at the focal distance "f1" from the lens 13-1 is turned into a parallel beam as it passes through the lens 13-1.

The second embodiment will be summarized with reference to the case where the design image magnification is set to 3. In this case, a lens with a focal distance of 1.5 mm is selected as the lens 13-1, and a lens with a focal distance of 4.5 mm is selected as the lens 13-2. The SOA array 11 is positioned at a distance of 1.5 mm from the principal plane of the lens 13-1, and the optical fiber array 12 is positioned at a distance of 4.5 mm from the principal plane of the lens 13-2.

With this arrangement, the beam spot size 3.5 μm of the SOAs 11-1 to 11-$n$ is enlarged three times so as to be equal to the beam spot size 10.5 μm of the optical fibers 12-1 to 12-$n$, thus making it possible to improve the optical coupling efficiency. Further, the pitch (P1) 60 μm of the SOA array 11 is expanded three times to 180 μm on the emergence side of the lens 13-2, whereby an SOA array with a pitch smaller than the diameter (125 μm) of the optical fibers can be used.

An exemplary internal arrangement of a module into which the SOA array device 10 is packaged will be now described with reference to FIG. 5, wherein the SOA array device 10-1 of the first embodiment is packaged into an SOA array module 10a-1.

A package 1 contains the SOA array 11, an SOA carrier 11a, lenses 13a and 13b, a thermistor 14 and a Peltier device 15, and has hermetic sealing windows 16a and 16b. Optical fiber arrays 12a and 12b are inserted into respective fixing sleeves 17a and 17b and secured to the package 1.

The SOA array 11 includes eight SOAs (i.e., the SOA array module 10a-1 is capable of switching eight channels). Also, the SOA array module 10a-1 has a total of 14 ceramic terminals as module terminals provided on side walls of the package.

The SOA array 11 is fixed to the SOA carrier 11a by, for example, gold-tin soldering. Each SOA of the SOA array 11 is wire-bonded to a corresponding strip line (not shown) of the SOA carrier 11a. The strip lines of the SOA carrier 11a are wire-bonded to the respective SOA driving terminals. Electrical signals are applied to the SOA array 11 through the SOA driving terminals and GND (ground) terminals, and the SOA array 11 amplifies light when driven.

The thermistor 14 is a device for monitoring the internal temperature of the package 1 and is wire-bonded to the thermistor driving terminals by strip lines. The Peltier device 15, which is a temperature control device for keeping the temperature inside the package 1 at a fixed value in accordance with the result of monitoring by the thermistor 14, is wire-bonded to the Peltier device-driving terminals by strip lines.

The lens 13a is arranged between the optical fiber array 12a and the SOA array 11, and the lens 13b is arranged between the SOA array 11 and the optical fiber array 12b. The lenses 13a and 13b are fitted in respective metal frames 131 and 132 made of stainless steel or the like, and are fixed in position by YAG (yttrium-aluminum-garnet crystal) laser welding or the like after being positioned such that the light emerging from the SOA array 11 is directed properly. After the lenses 13a and 13b are fixed, the optical fiber arrays 12a and 12b are positioned so that all channels may provide a maximum optical output, and then are welded to the package 1. The hermetic sealing windows 16a and 16b, which are made of glass, permit only light to transmit therethrough and prevent moisture and oxygen from entering the package 1.

Figure 6:
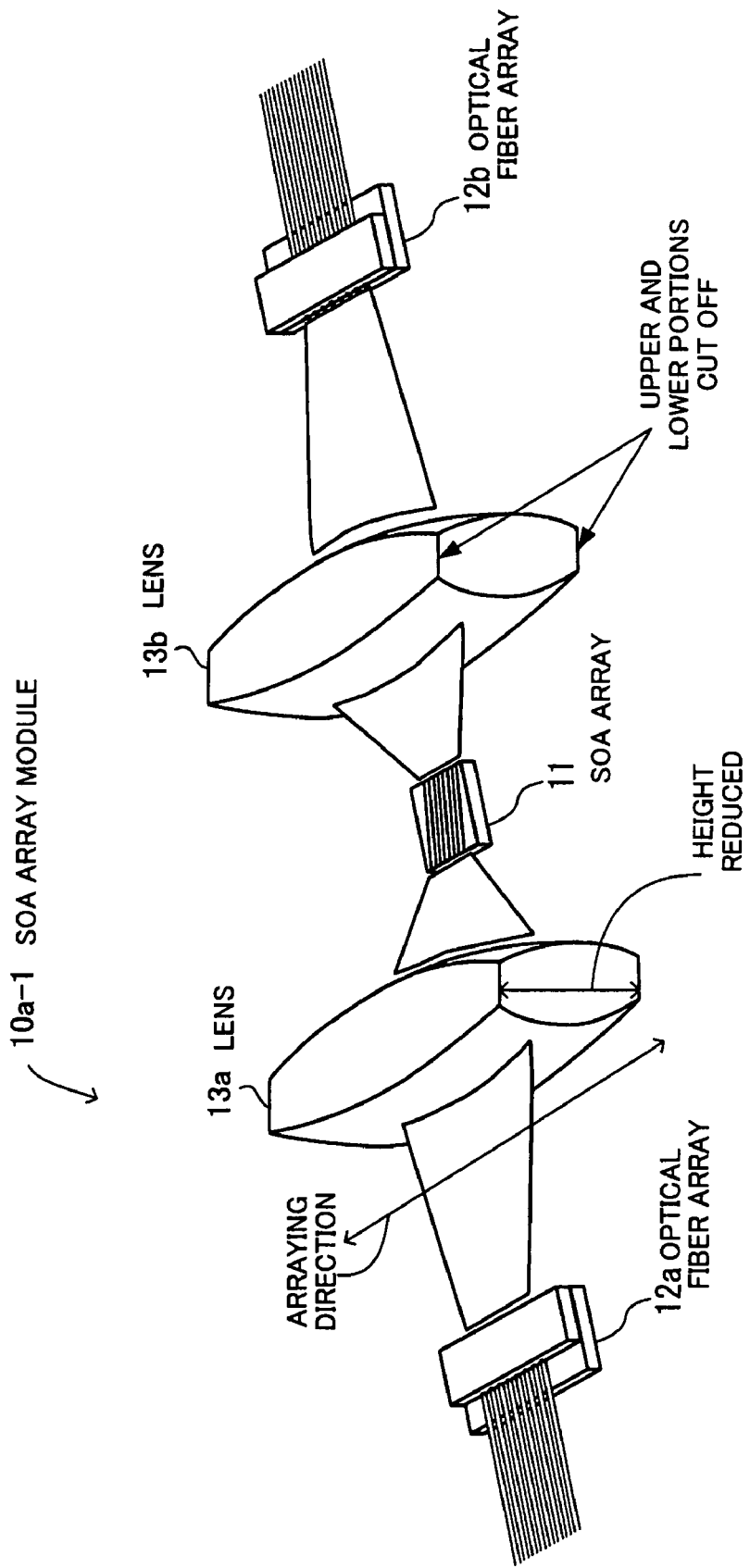
FIG. 6 illustrates optical coupling of the SOA array module.

FIG. 6 illustrates the optical coupling of the SOA array module 10a-1. In order to minimize the thickness of the package 1 of the SOA array module 10a-1, the lenses 13a and 13b are each prepared by cutting off upper and lower portions of an ordinary lens, as illustrated, so as to be elongate in the arraying direction.

Thus, the lenses 13a and 13b are each constructed as a cut lens such that each lens is elongate in the arraying direction and has an aperture in the perpendicular direction large enough to admit light to be directed to or radiated from the SOAs. This makes it possible to reduce the height (package thickness) of the SOA array module 10a-1, whereby the size of the module (thickness of the package 1) as well as power consumption can be reduced.

Figure 7:
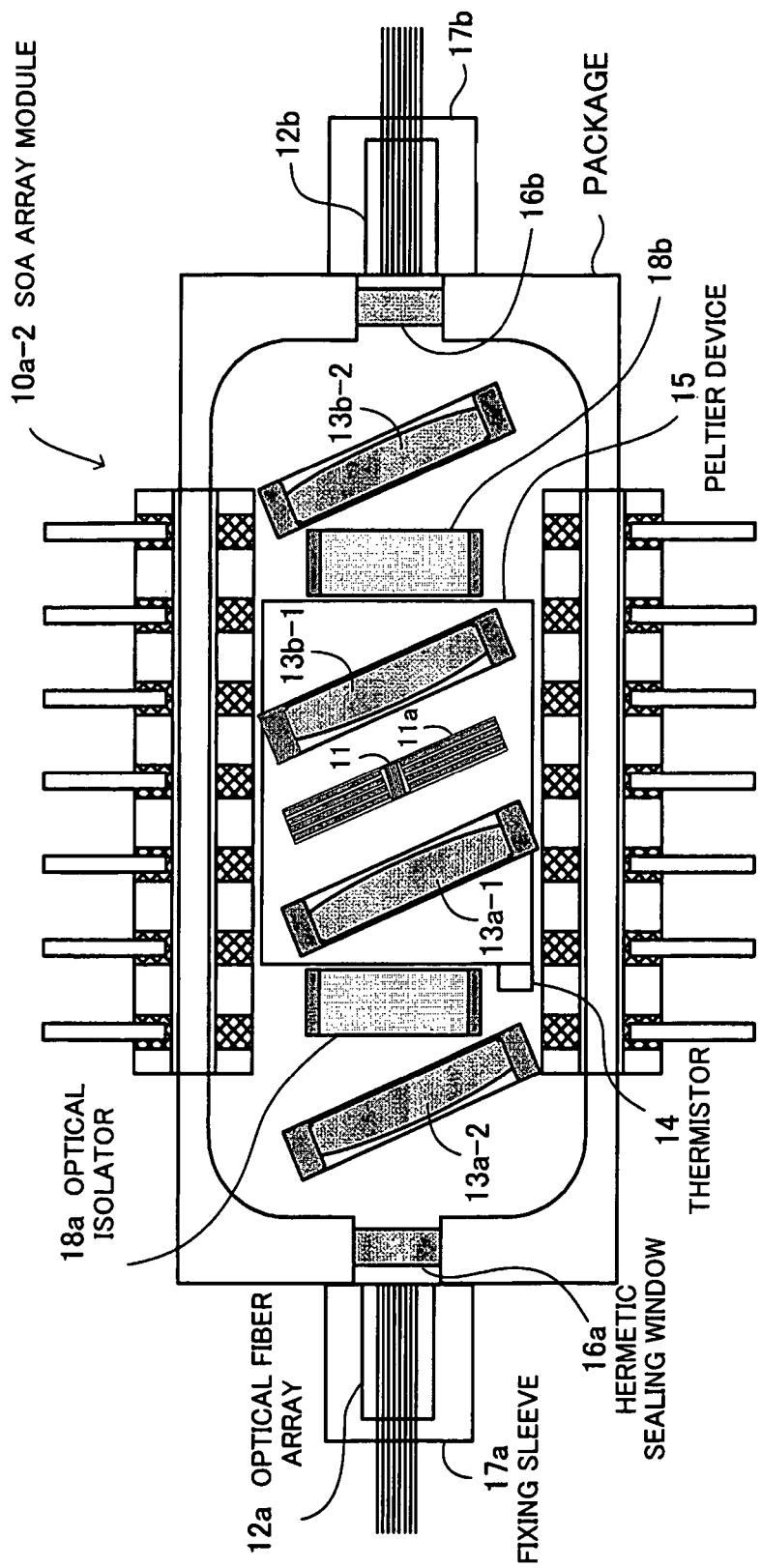
FIG. 7 exemplifies the internal arrangement of another SOA array module.

FIG. 7 shows an exemplary internal arrangement of an SOA array module 10a-2 into which the SOA array device 10-2 of the second embodiment is packaged.

The package 1 includes the SOA array 11, the SOA carrier 11a, lenses 13a-1, 13a-2, 13b-1 and 13b-2, the thermistor 14, the Peltier device 15, the hermetic sealing windows 16a and 16b, and optical isolators 18a and 18b. The optical fiber arrays 12a and 12b are inserted into the respective fixing sleeves 17a and 17b and secured to the package 1.

The SOA array module 10a-2 has a construction such that two lenses are arranged on each side of the SOA array to achieve optical coupling. The lenses 13a-1 and 13a-2 are arranged between the optical fiber array 12a and the SOA array 11, and the lenses 13b-1 and 13b-2 are arranged between the SOA array 11 and the optical fiber array 12b.

The optical isolator 18a, which allows light to pass only in the forward direction and shuts off reflected light, is arranged between the lenses 13a-1 and 13a-2, and the optical isolator 18b having the same function is arranged between the lenses 13b-1 and 13b-2. For each of the optical isolators 18a and 18b, an isolator with an aperture capable of passing all of 8-channel light beams is used.

Figure 5:
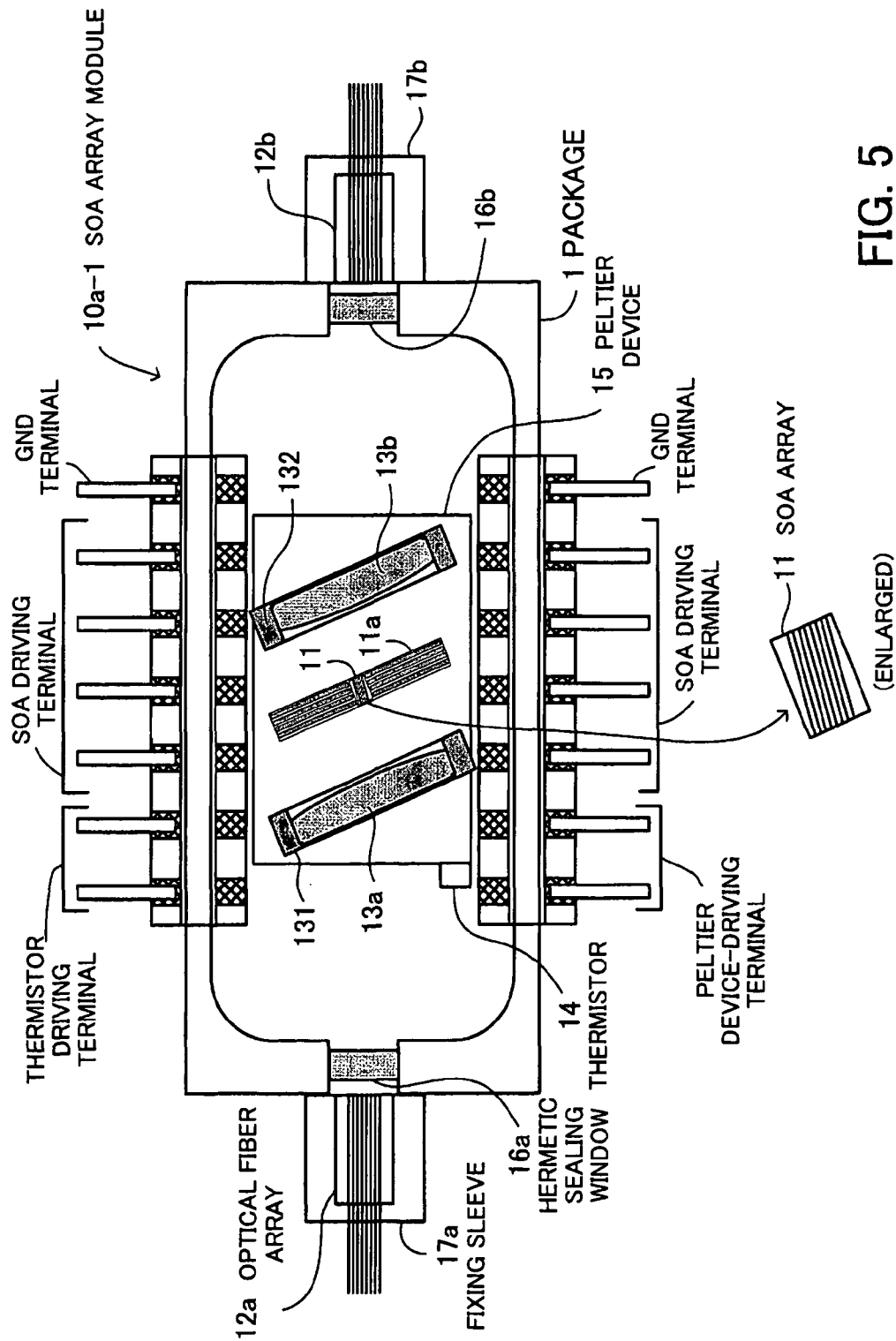
FIG. 5 exemplifies the internal arrangement of an SOA array module.

The optical isolators may also be used in the SOA array module 10a-1 shown in FIG. 5 in such a manner that one optical isolator is arranged between the lens 13a and the SOA array 11 while the other between the SOA array 11 and the lens 13b. In other respects, the SOA array module 10a-2 is constructed in the same manner as that shown in FIG. 5, and therefore, no further explanation of the construction is given here.

Figure 8:
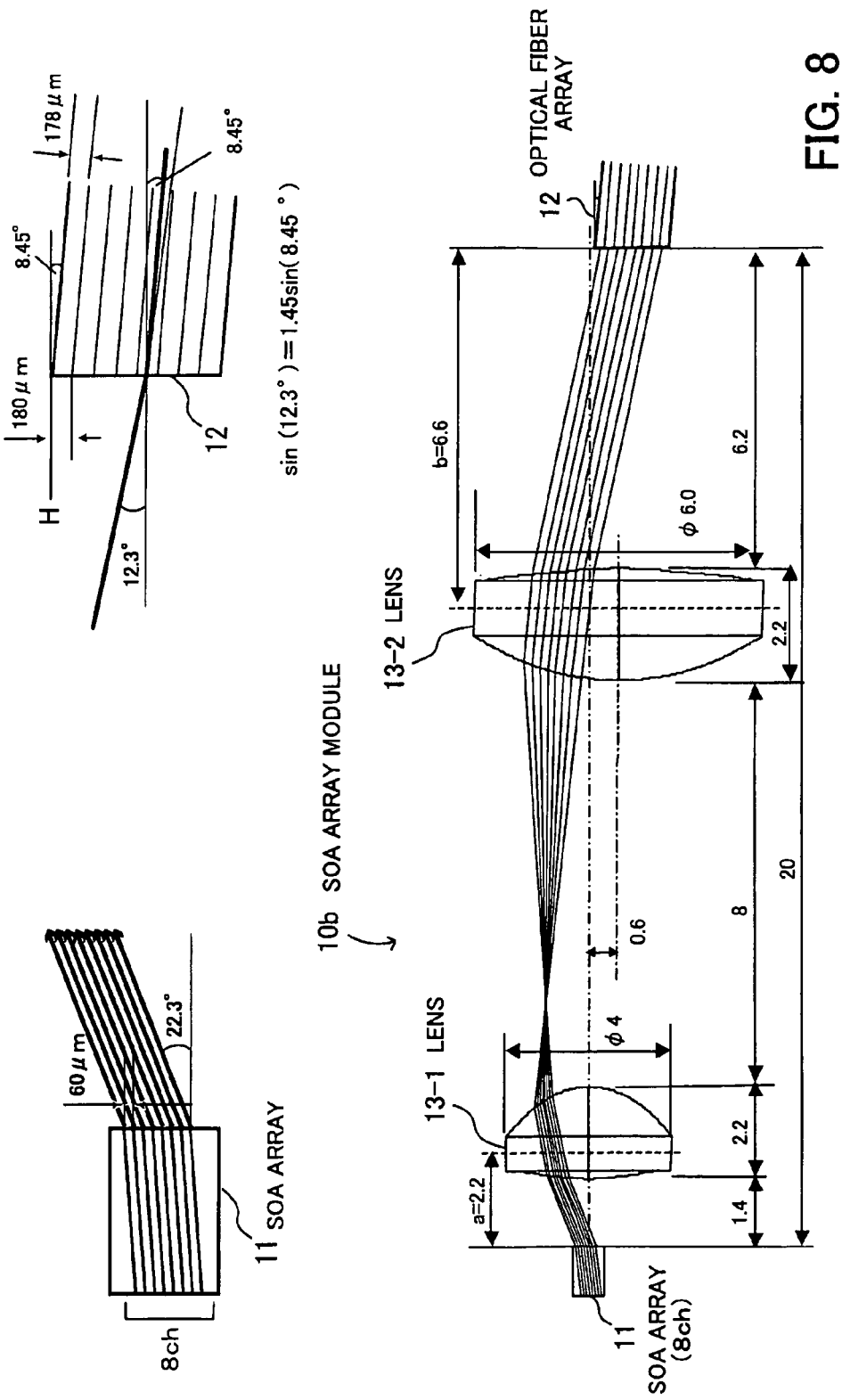
FIG. 8 illustrates optical coupling of the SOA array module.

The following describes in detail the manner of how the SOA array module is actually designed. FIG. 8 illustrates optical coupling of an SOA array module 10b. The SOA array module 10b is an optical coupling system having two lenses 13-1 and 13-2 arranged on either side of the SOA array and having an image magnification of 3. In the figure, the numerical values indicate actually calculated dimensions of the embodiment, and the loci of eight beams represent the centers of intensity distributions of the respective beams output from the SOA array 11.

The 8-channel SOA array 11 has eight SOAs arrayed with a pitch of 60 μm, and light emerges obliquely from all SOAs at an emergence angle of 22.3°. The lens 13-1 has a diameter φ of 4 mm and is positioned at a distance of 1.4 mm from the SOA array 11 such the light emerging from the SOA array is incident substantially on one half of the lens.

The lens 13-2 is positioned at a distance of about 8 mm from the lens 13-1 with the center thereof shifted by about 0.6 mm from the center of the lens 13-1. Like the lens 13-1, the lens 13-2 receives light substantially on one half thereof. With this arrangement, the SOA array is optically coupled with the optical fiber array 12 which is positioned at a distance of 6.2 mm from the lens 13-2.

The distance "a" from the end face of the SOA array 11 to the principal plane of the lens 13-1 is 2.2 mm, and the distance "b" from the principal plane of the lens 13-2 to the end face of the optical fiber array 12 is 6.6 mm. Therefore, the image magnification is 6.6/2.2=3.

Thus, in the optical coupling system of the SOA array module 10b, the design image magnification is set to 3, and accordingly, the SOA pitch 60 μm is expanded up to 180 μm on the end face of the optical fiber array 12. Also, the mode size of the SOA is enlarged three times so as to be nearly equal to the mode size of the optical fiber, thus permitting highly efficient optical coupling.

The light falls upon the end face of the optical fiber array 12 obliquely at an incidence angle of 12.3°. Where the refractive index of the optical fiber is 1.45, therefore, the optical fiber array 12 needs to be inclined by θ with respect to the normal H in order for the light to pass through the center of the core of the optical fiber. From Snell's law, $1 \cdot \sin(12.3°) = 1.45 \cdot \sin θ$, and therefore, θ=8.45°. Namely, to cause the light incident obliquely at the incidence angle 12.3° to propagate straight through the optical fiber, the optical fiber array 12 has to be inclined at 8.45° with respect to the normal H.

Figure 9:
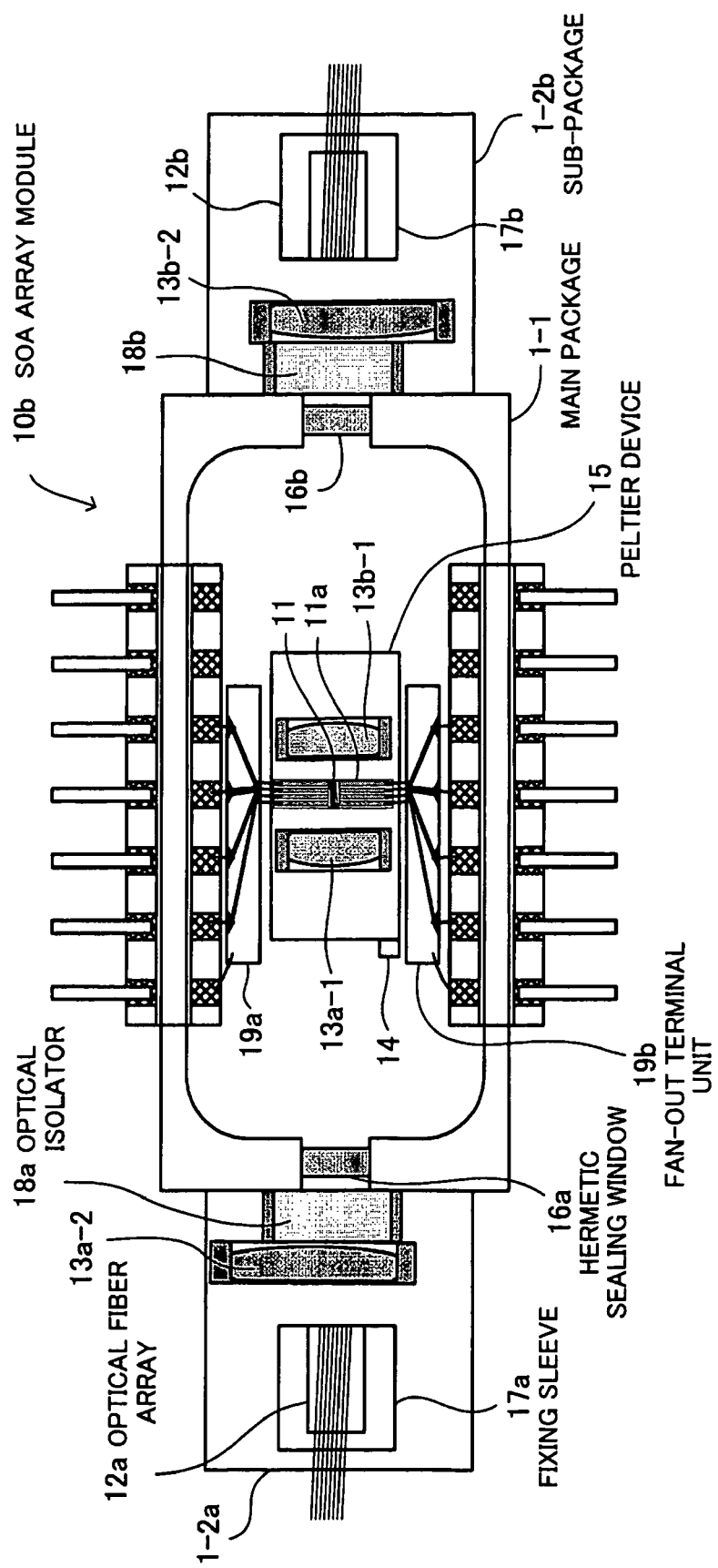
FIG. 9 exemplifies the internal arrangement of still another SOA array module.

FIG. 9 shows an exemplary internal arrangement of the packaged SOA array module 10b. The SOA array module 10b, which implements the optical coupling as described above with reference to FIG. 8, comprises a main package 1-1 and sub-packages 1-2a and 1-2b.

The main package 1-1 contains the SOA array 11, the SOA carrier 11a, the lenses 13a-1 and 13b-1 (first lenses), the thermistor 14, the Peltier device 15, the hermetic sealing windows 16a and 16b, and fan-out terminal units 19a and 19b.

The pitch of the electrodes of the SOA carrier 11a significantly differs from the pitch of the ceramic terminals of the main package 1-1. Generally, therefore, a fan-out terminal unit is inserted between the SOA carrier 11a and the ceramic terminal array of the main package 1-1 to make up for the pitch difference. FIG. 9 shows the arrangement wherein the fan-out terminal units 19a and 19b are arranged on opposite sides of the SOA carrier 11a and connected thereto by strip lines.

Also, inside the main package 1-1, the lenses 13a-1 and 13b-1 are arranged, together with the Peltier device 15, in the vicinity of the SOA array 11, and these elements are sealed off from the outside by the hermetic sealing windows 16a and 16b so that the SOA array 11 may be shielded from moisture and oxygen.

Further, the sub-packages 1-2a and 1-2b are externally attached to the main package 1-1 so as to face the respective hermetic sealing windows 16a and 16b. The sub-package 1-2a includes the optical isolator 18a for shutting off reflected light, the lens 13a-2 (second lens), the optical fiber array 12a and the fixing sleeve 17a, and the sub-package 1-2b includes the optical isolator 18b for shutting off reflected light, the lens 13b-2 (second lens), the optical fiber array 12b and the fixing sleeve 17b. The elements in each sub-package are fixed by YAG laser welding or the like after being properly positioned.

Figure 10:
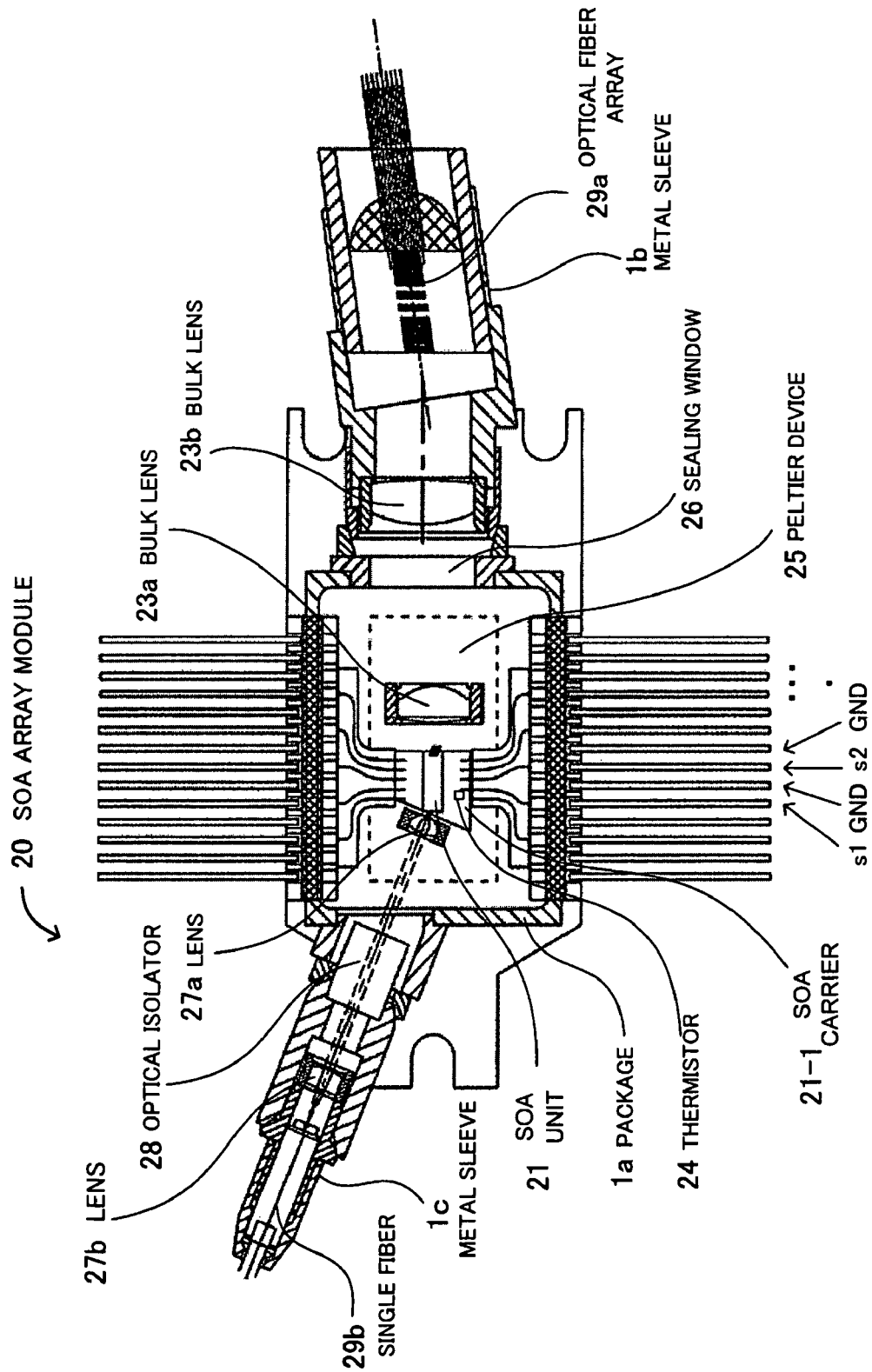
FIG. 10 shows the internal arrangement of an SOA array module.

The following describes the construction of an SOA array module (optical gate array module) for performing N:1 optical switching. FIG. 10 shows the internal arrangement of such an SOA array module, wherein N=8.

The SOA array module 20 has a construction such that two lenses are provided on each side for achieving optical coupling. A package 1a contains an SOA unit (optical gate unit) 21, an SOA carrier (optical gate carrier) 21-1, a bulk lens 23a (first lens), a bulk lens 23b (second lens), a thermistor 24, a Peltier device 25, a hermetic sealing window 26, a lens 27a (third lens), a lens 27b (fourth lens), and an optical isolator 28 (the bulk lenses 23a and 23b correspond to N-port-side lenses, while the lenses 27a and 27b correspond to single port-side lenses).

A metal sleeve 1b holds an optical fiber array 29a therein, and a metal sleeve 1c holds a single optical fiber 29b therein. The metal sleeves 1b and 1c are welded to the package 1a.

Figure 11:
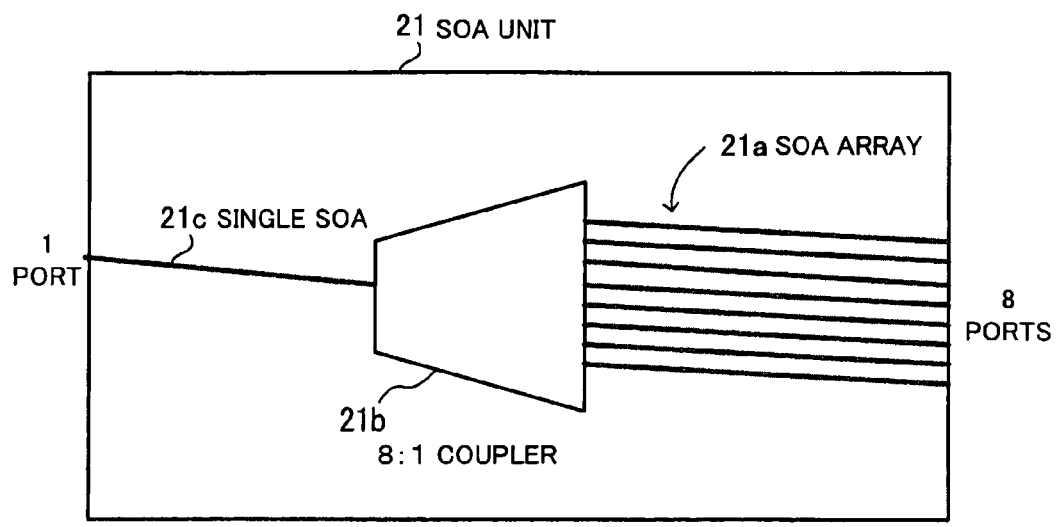
FIG. 11 shows the internal arrangement of an SOA unit.

FIG. 11 shows the internal arrangement of the SOA unit 21. The SOA unit 21 comprises an SOA array (optical gate array) 21a, an 8:1 coupler 21b, and a single SOA (single optical gate) 21c. The SOA array 21a is an array of eight SOAs, and the 8:1 coupler 21b couples the SOA array 21a and the single SOA 21c with each other. Also, the SOA unit 21 has eight ports on one end face thereof and one port on the other end face.

Referring again to FIG. 10, the SOA unit 21 is fixed on the SOA carrier 21-1 by, for example, gold-tin soldering. Each SOA of the SOA unit 21 is wire-bonded to a corresponding strip line (not shown) of the SOA carrier 21-1. The strip lines of the SOA carrier 21-1 are wire-bonded to respective SOA driving terminals (module terminals for driving the SOAs of the SOA array 21a and the single SOA 21c) so that the SOAs may be applied with electrical signals through the SOA driving terminals and GND terminals. The SOA array 21a and the single SOA 21c of the SOA unit 21 individually amplify light when driven.

The terminals of the SOA array module 20 are arranged such that the SOA driving terminals alternate with the GND terminals. Provided the SOA driving terminals are s1, s2, s3, . . . , for example, the terminals are arranged as: s1, GND, s2, GND, . . . , as shown in FIG. 10.

If the SOA driving terminals are placed next to each other, crosstalk is likely to occur, possibly causing malfunction. By designing the SOA array module 20 such that each signal terminal exists between the GND terminals, it is possible to suppress the crosstalk.

The thermistor 24 is a device for monitoring the temperature inside the package 1a and is wire-bonded to a thermistor driving terminal by a strip line. The Peltier device 25 is a temperature control device for keeping the temperature in the package 1a at a constant level based on the result of the monitoring by the thermistor 24 and is wire-bonded to a Peltier device-driving terminal by a strip line.

The bulk lenses 23a and 23b are arranged between the 8-port-side end face of the SOA unit 21 and the optical fiber array 29a. The lenses 27a and 27b are arranged between the single port-side end face of the SOA unit 21 and the single optical fiber 29b.

The bulk lenses 23a and 23b and the lenses 27a and 27b are each fitted in a metal frame and fixed after being positioned so that the light emerging from the SOA unit 21 may be directed properly.

After the lenses are fixed in position, the optical fiber array 29a and the single optical fiber 29b are positioned so that all channels may provide a maximum optical output, and then the optical fiber array 29a is fixed in the metal sleeve 1b while the single optical fiber 29b is fixed in the metal sleeve 1c. The hermetic sealing window 26 is a glass window for admitting light only and preventing moisture and oxygen from entering the package 1a.

The SOA unit 21, the bulk lenses 23a and 23b and the optical fiber array 29a are positioned such that the principal planes of the bulk lenses 23a and 23b, the 8-port-side end face of the SOA unit 21 and the end face of the optical fiber array 29a are parallel with each other.

Let the focal distances of the bulk lenses 23a and 23b be f1 and f2, respectively. The SOA unit 21 and the bulk lens 23a constitute a confocal system such that the SOA unit 21 is positioned at the focal distance f1 from the bulk lens 23a. Also, the bulk lens 23b and the optical fiber array 29a constitute a confocal system such that the optical fiber array 29a is positioned at the focal distance f2 from the bulk lens 23b.

In this case, the image magnification of the bulk lenses, which is so determined as to be equal to the ratio of the beam spot size of all the eight optical fibers of the optical fiber array 29a to that of all the eight SOAs of the SOA unit 21, is equal to f2/f1. Relative positioning of the SOA unit 21, the bulk lenses 23a and 23b and the optical fiber array 29a is basically identical with that explained above with reference to FIG. 4, and accordingly, detailed description thereof is omitted.

On the other hand, the lenses 27a and 27b are positioned relative to the SOA unit 21 such that the principal plane of the lens 27a is perpendicular to the light emerging from the single port of the SOA unit 21, to thereby optically couple the SOA unit 21 and the single optical fiber 29b with each other through the lenses 27a and 27b. The optical isolator 28 arranged between the lenses 27a and 27b passes only the light propagated in the intended direction and shuts off reflected light (the optical isolator may be arranged between the bulk lenses 23a and 23b).

Figure 12:
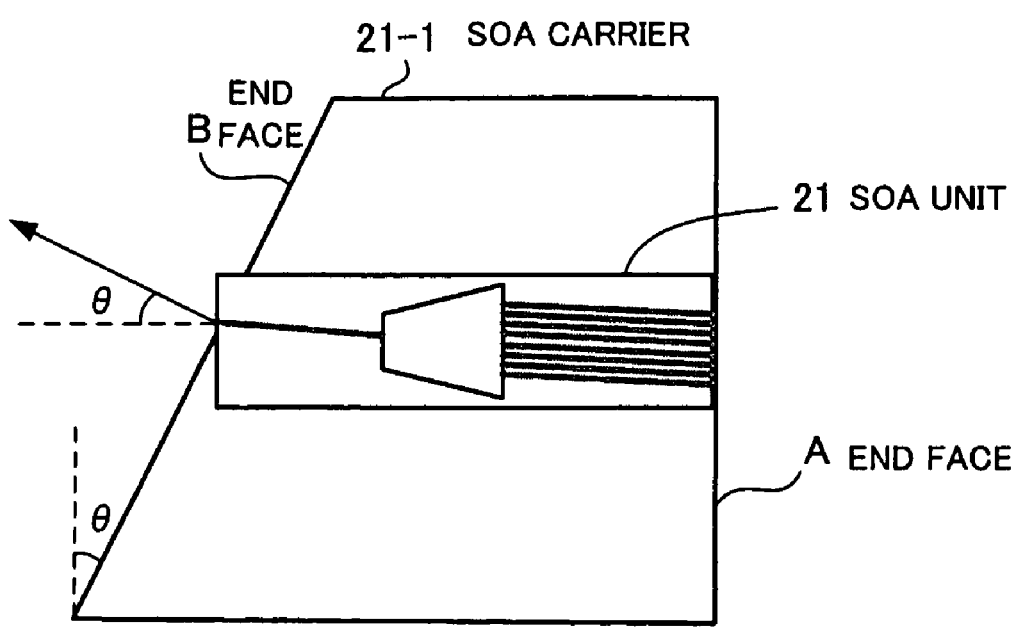
FIG. 12 shows the shape of an SOA carrier.

FIG. 12 illustrates the shape of the SOA carrier 21-1. The SOA carrier 21-1, on which the SOA unit 21 is mounted, is formed such that an 8-port-side end face A thereof is parallel with the 8-port-side end face of the SOA unit 21.

The single port-side end face B of the SOA carrier 21-1 is not parallel with the single port-side end face of the SOA unit 21, but is inclined at an angle nearly equal to the emergence angle θ of light from the SOA unit 21.

Figure 13:
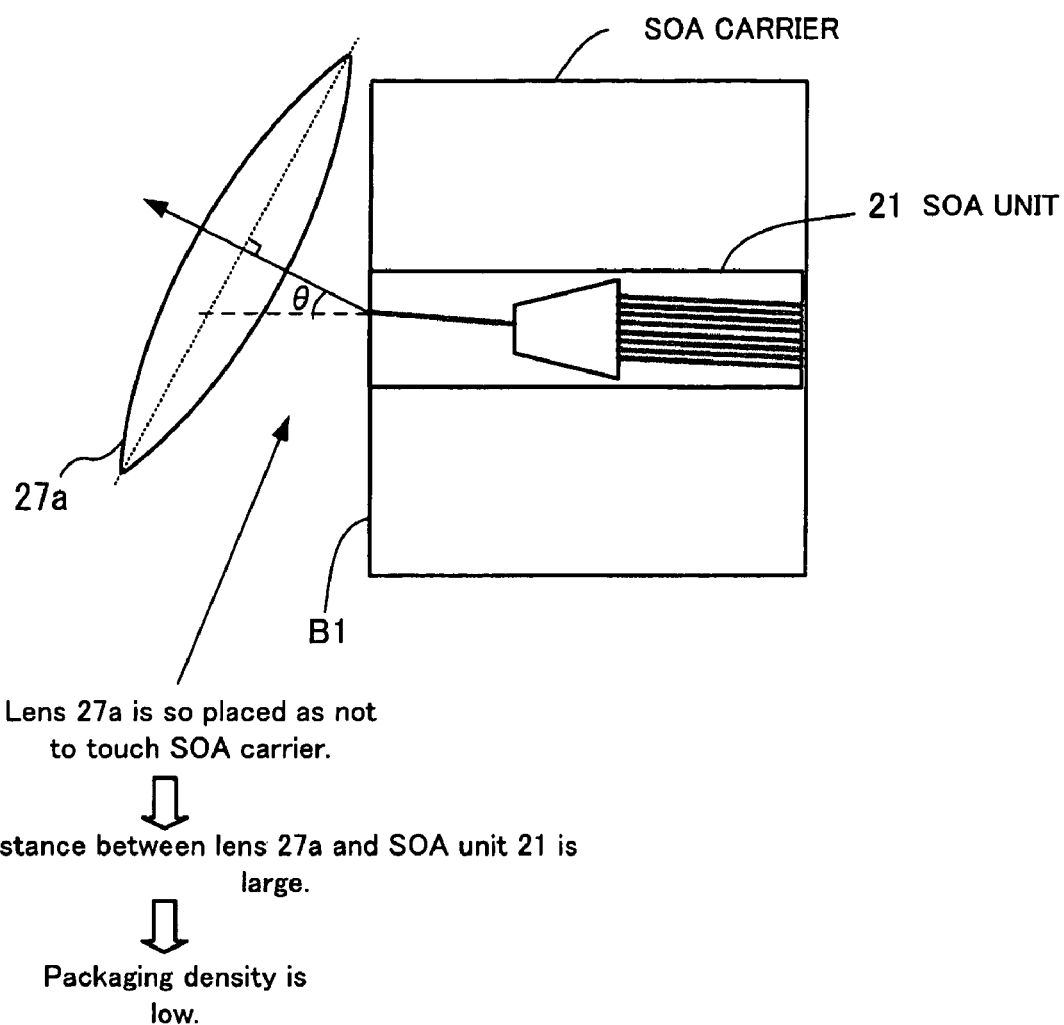
FIG. 13 is a conceptual diagram explaining the reason why a carrier end face is inclined.
Figure 14:
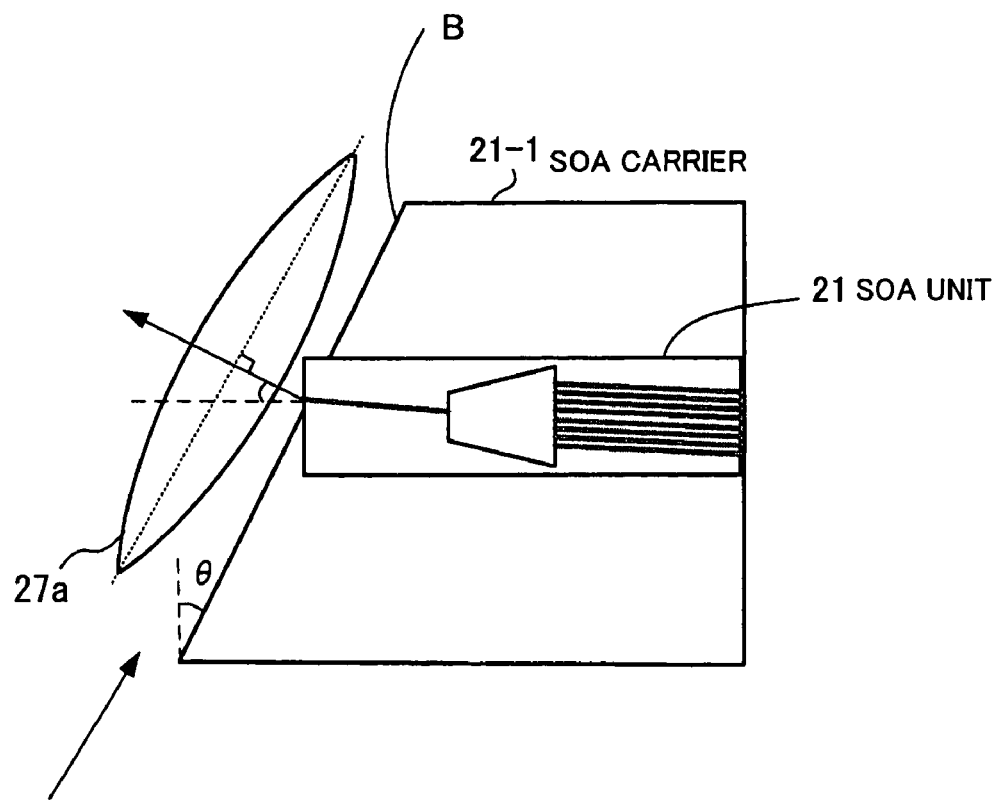
FIG. 14 is a conceptual diagram also explaining the reason why the carrier end face is inclined.

FIGS. 13 and 14 are conceptual diagrams for explaining the reason why the end face B is inclined. Suppose that the SOA carrier has an end face B1 parallel with the single port-side end face of the SOA unit 21, as shown in FIG. 13.

Provided the emergence angle of light from the SOA unit 21 is θ, in order for the lens 27a to receive the emerging light, it is necessary that the principal plane of the lens 27a be positioned perpendicularly to the emerging light. Where the end face B1 is parallel with the single port-side end face of the SOA unit 21, the lens 27a has to be spaced at a substantial distance from the single port-side end face of the SOA unit 21 in order that the lens 27a may be positioned perpendicularly to the emerging light without touching the end face B1 of the SOA carrier 21-1.

On the other hand, the end face B shown in FIG. 14 is inclined at an angle nearly equal to the emergence angle θ. Accordingly, when the lens 27a is positioned perpendicularly to the emerging light, the lens 27a is allowed to be directed parallel to the inclined end face B and thus can be located closer to the single port-side end face of the SOA unit 21.

In this manner, the single port-side end face B of the SOA carrier 21-1 is inclined at an angle almost equal to the emergence angle θ of light from the SOA unit 21, and this permits the lens 27a to be located close to the SOA unit 21. It is therefore possible to make good use of the packaging space and thus to reduce the size of the SOA array module 20.

Figure 15:
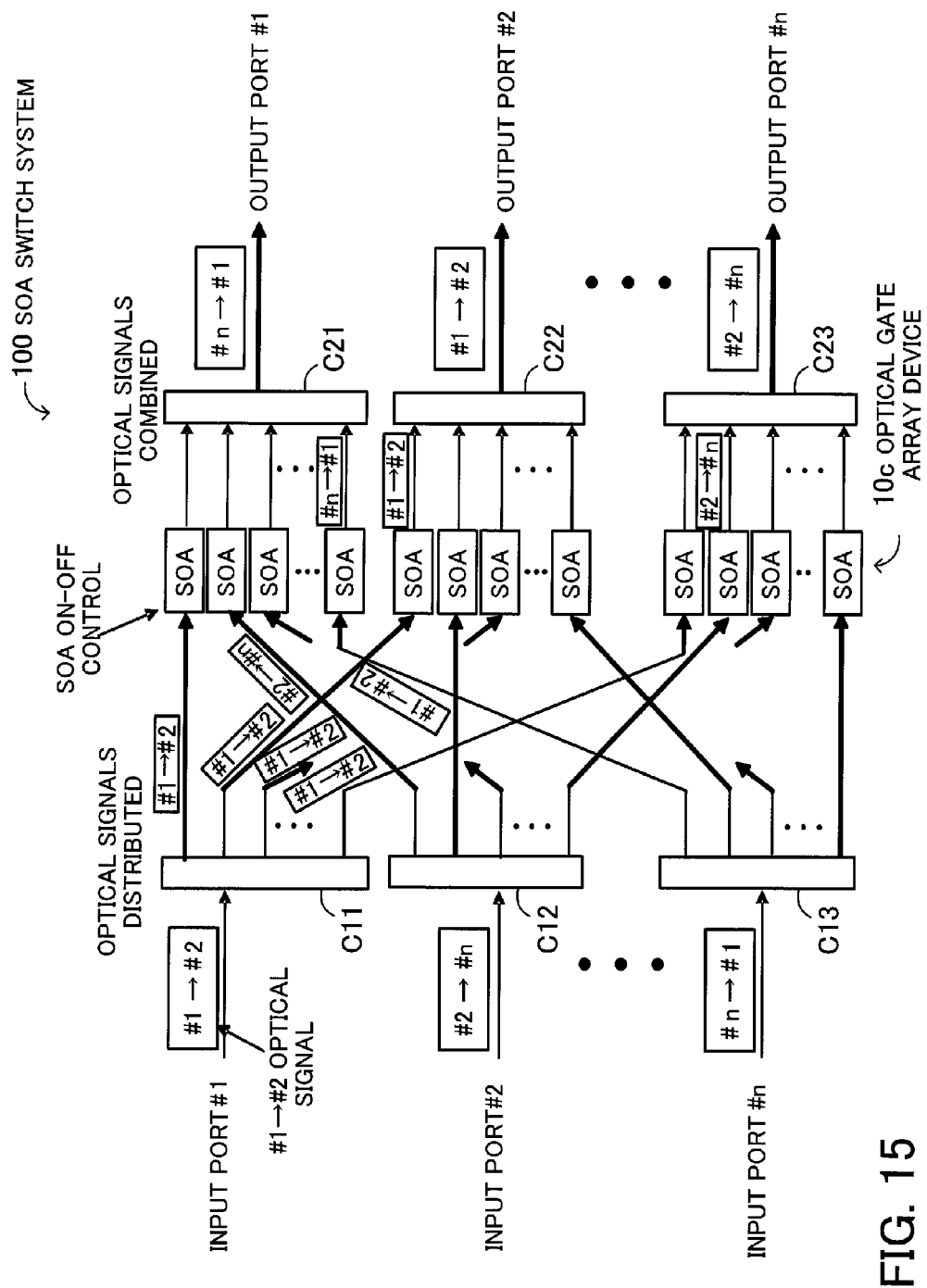
FIG. 15 shows the configuration of an SOA switch system.

An SOA switch system will be now described with reference to FIG. 15 showing a configuration thereof. The SOA switch system 100 comprises distributing couplers C11 to C13, combining couplers C21 to C23, and an optical gate array device 10c having a plurality of SOAs.

The principle of switching operation will be explained. Optical signals input from the input ports are split by the distributing couplers C11 to C13 into as many optical signals as the input/output ports, and only SOAs associated with desired ports are switched on while the SOAs associated with the other ports are switched off, to allow the outputs from the SOAs to be combined by the combining couplers C21 to C23, whereby only the optical signals from the input ports to be connected are selected (amplified) and connected to the output ports.

In many cases, the number n of optical gates (SOAs) in the optical gate array device 10c is equal to the number n of input/output ports, and generally, n is set to 4 or 8. Where the number n of input/output ports is greater than 8, however, the number of input/output ports is often different from the number of optical gates in the optical gate array device 10c, and in such cases, the number of optical gates in the optical gate array device 10c is set so that the number of input/output ports may be an integer multiple of the number of optical gates.

Figure 16:
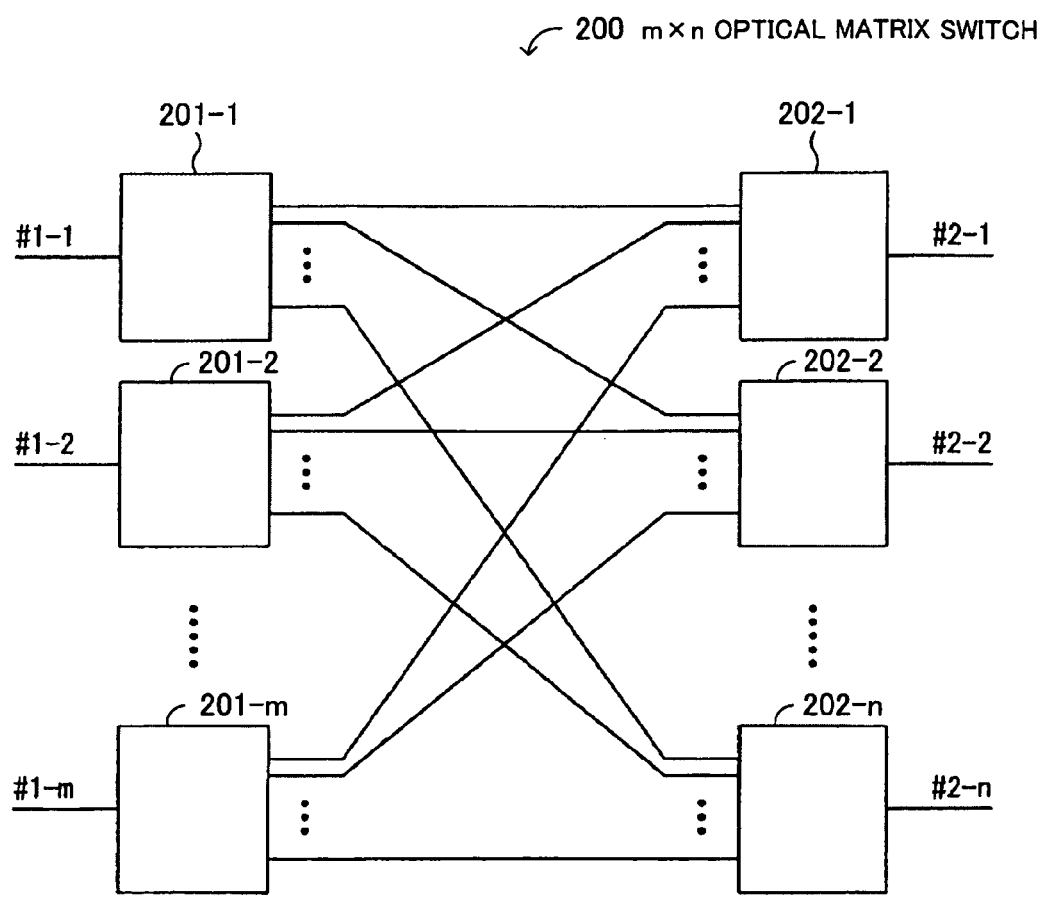
FIG. 16 shows the configuration of an m×n optical matrix switch.

An m×n optical matrix switch will be now described. FIG. 16 shows the configuration of an m×n optical matrix switch 110, wherein the number of input ports is m (#1-1 to #1-m) and the number of output ports is n (#2-1 to #2-n).

The optical matrix switch 110 comprises 1×n optical distributors 111-1 to 111-m, which are m in number, and m×1 optical combiners 112-1 to 112-n, which are n in number. The input light from the input port #1-1 is split into n beams by the optical distributor 111-1, and the split beams are input to the optical combiners 112-1 to 112-n, respectively.

Similarly, the input light from the input port #1-2 is split into n beams by the optical distributor 111-2, and the split beams are input to the respective optical combiners 112-1 to 112-n. The input light from the input port #1-m is split into n beams by the optical distributor 111-m, and the split beams are input to the respective optical combiners 112-1 to 112-n.

Among the m optical signals input to the optical combiner 112-1, one optical signal is selected in accordance with a driving signal from a switch controller, not shown, and is output from the output port #2-1. Likewise, at the optical combiner 112-2, one optical signal is selected from among the m input optical signals in accordance with a driving signal from the switch controller and is output from the output port #2-2. Also, among the m optical signals input to the optical combiner 112-n, one optical signal is selected in accordance with a driving signal from the switch controller and is output from the output port #2-n.

The optical combiners 112-1 to 112-n can also be switched in such a manner that all SOAs associated with the m input optical signals are switched off to thereby shut down the output ports.

Figure 17:
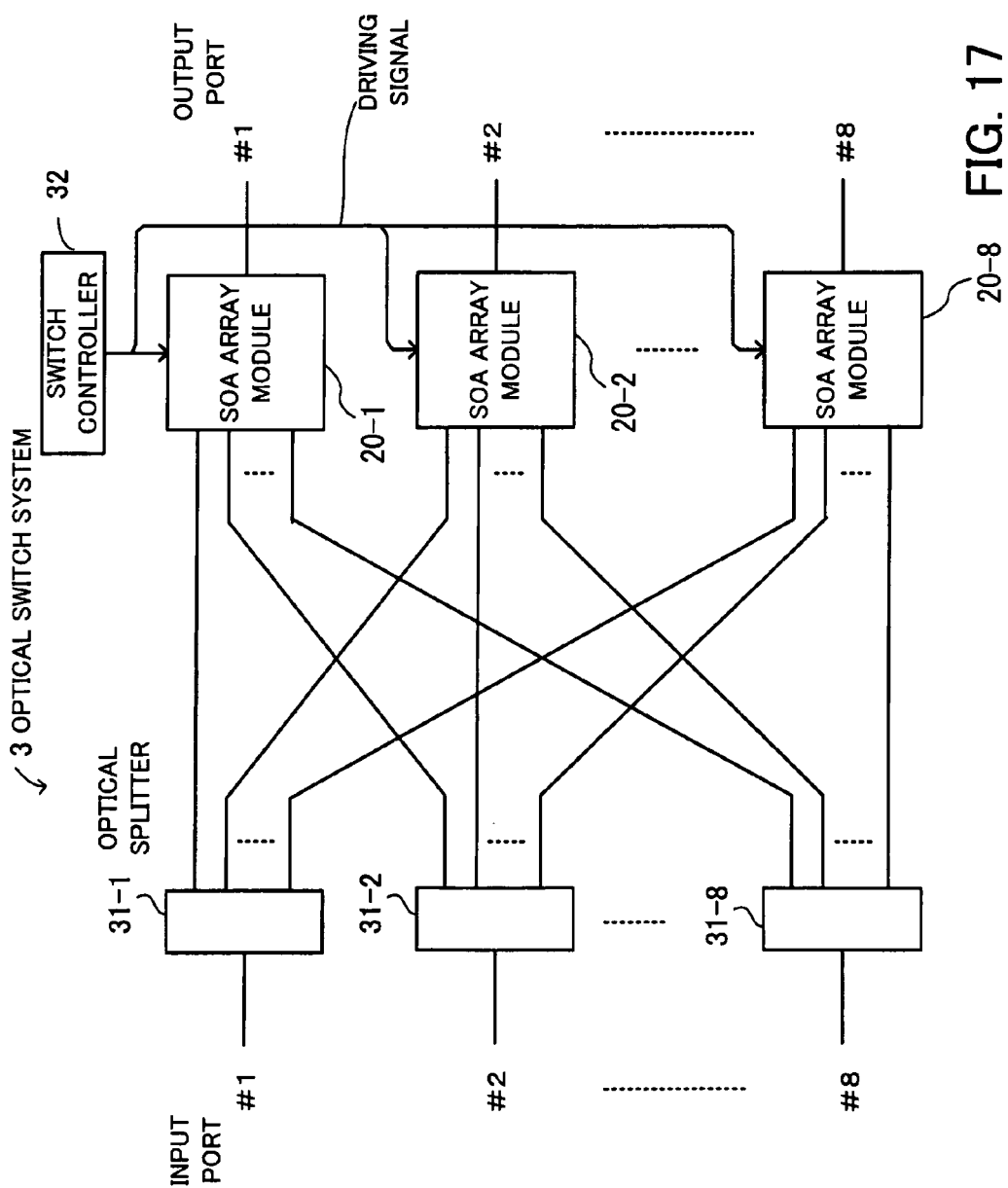
FIG. 17 shows the configuration of an 8×8 optical switch system.
Figure 18:
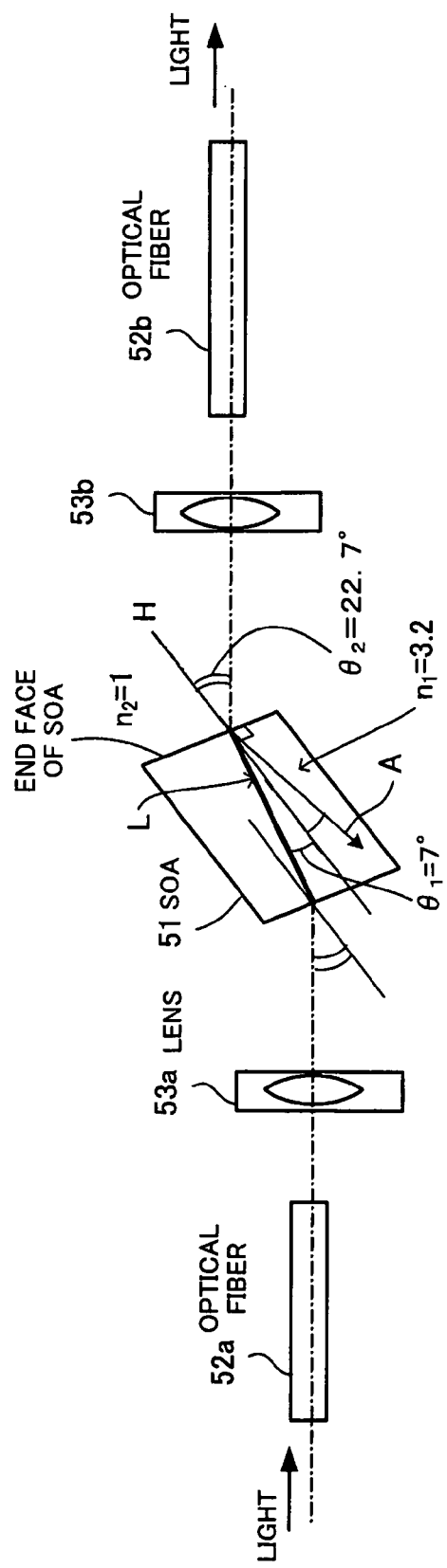
FIG. 18 shows a conventional arrangement for optical coupling between an SOA and an optical fiber.
Figure 19:
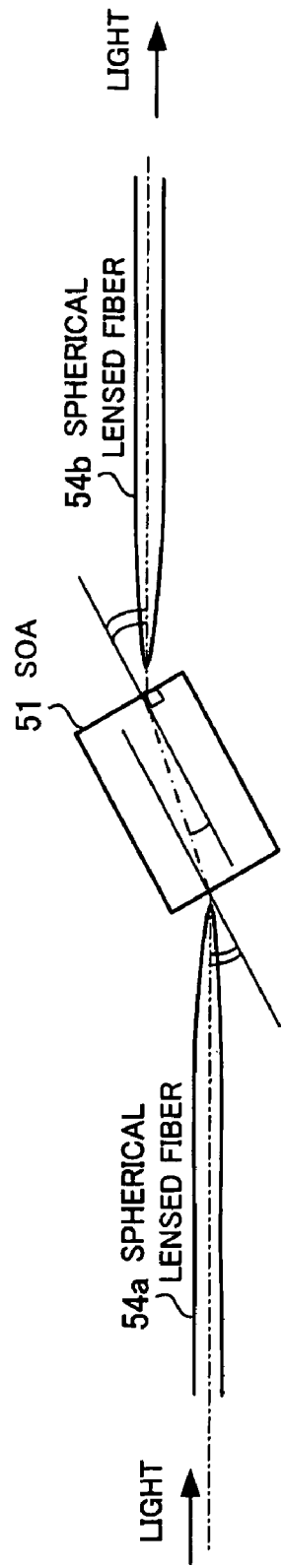
FIG. 19 also shows a conventional arrangement for optical coupling between an SOA and an optical fiber.

The following describes an 8×8 optical switch system (m=n=8) to which the SOA array module 20 shown in FIG. 10 is applied. FIG. 17 shows the configuration of such an 8×8 optical switch system.

The optical switch system 3 comprises eight optical splitters 31-1 to 31-8 each with one input and eight outputs, eight SOA array modules 20-1 to 20-8 each with eight inputs and one output, and a switch controller 32.

The optical splitters 31-1 to 31-8 and the SOA array modules 20-1 to 20-8 are connected in the same manner as the optical matrix switch 110 of FIG. 16 on the assumption that the switch 110 is configured to satisfy the relationship m=n=8.

Also, the SOA array modules 20-1 to 20-8 have the internal arrangement identical with that shown in FIG. 10, and accordingly, detailed description thereof is omitted. In the optical switch system 3, the SOA array module 20 shown in FIG. 10 is used in a manner such that the eight ports serve as input ports and the single port as an output port (the bulk lenses 23a and 23b in FIG. 10 correspond to the input port-side lenses, while the lenses 27a and 27b correspond to the output port-side lenses).

The switch controller 32 sends driving signals to the SOA array modules 20-1 to 20-8 to switch on and off the individual SOAs. The SOAs of each module are driven in the following manner. One SOA among the eight SOAs is switched on while the other seven SOAs are switched off, whereby one optical signal is selected and output from the output port. Alternatively, all of the eight SOAs are switched off, thereby shutting down the output port.

As described above, the SOA array device 10 is constructed such that the lens 13 is arranged between the SOA array 11 and the optical fiber array 12 to collectively achieve optical coupling between all SOAs of the SOA array 11 and all optical fibers of the optical fiber array 12. Also, the image magnification of the lens 13 is determined so as to be equal to the ratio of the beam spot size of the optical fibers to that of the SOAs, and the ratio of the pitch of the optical fiber array 12 to that of the SOA array 11 is set so as to be equal to the image magnification.

This permits the SOA array 11 to be fabricated with an increased number of SOAs formed per unit area of the wafer, so that the SOA pitch can be reduced to a value smaller than the diameter 125 μm of the optical fiber, for example, to 80 μm or 50 μm. Further, the beam spot size of the SOA is enlarged so as to be equal to that of the optical fiber, thus making it possible to improve the optical coupling efficiency.

In the optical gate array device of the present invention, the lens is arranged between the optical gate array and the optical fiber array to collectively achieve optical coupling between all optical gates of the optical gate array and all optical fibers of the optical fiber array. This permits the use of an optical gate array with a pitch smaller than the diameter of the optical fiber, making it possible to increase the degree of integration of the optical gate array. Further, the beam spot size of the optical gate is enlarged so as to be equal to that of the optical fiber, and accordingly, the optical coupling efficiency can be improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical gate array device for controlling optical signals, comprising:
    an optical gate array having an array of optical gates;
    an optical fiber array having an array of optical fibers; and
    a first lens and a second lens arranged between the optical gate array and the optical fiber array, the first lens for collectively achieving optical coupling between all of the optical gates of the optical gate array and all of the optical fibers of the optical fiber array,
    wherein the first lens has a center aligned with a center of the optical gate array in an arraying direction thereof so that light beams emerging from the optical gates may pass through one half of the first lens only,
    and wherein an off-center portion of the second lens is substantially an only region that receives the light beams passing through said one half of the first lens.

2. The optical gate array device according to claim 1, wherein the first lens is a single bulk lens and the second lens is a single bulk lens.

3. An optical gate array device for controlling optical signals, comprising:
    an optical gate array having an array of optical gates;
    an optical fiber array having an array of optical fibers; and
    a first lens and a second lens arranged between the optical gate array and the optical fiber array, the first lens for collectively achieving optical coupling between all of the optical gates of the optical gate array and all of the optical fibers of the optical fiber array,
    wherein the first lens has a center aligned with a center of the optical gate array in an arraying direction thereof so that light beams emerging from the optical gates pass through only an off-center portion of the first lens,
    and wherein an off-center portion of the second lens is substantially an only region that receives the light beams passing through only an off-center portion of the first lens.

* * * * *